US012536952B2

(12) United States Patent
Jeong et al.

(10) Patent No.: US 12,536,952 B2
(45) **Date of Patent: *Jan. 27, 2026**

(54) PIXEL OF A DISPLAY DEVICE, AND DISPLAY DEVICE

(71) Applicant: Samsung Display Co., Ltd., Yongin-Si (KR)

(72) Inventors: Minjae Jeong, Hwaseong-si (KR); Jangmi Kang, Seoul (KR); Hyeongseok Kim, Hwaseong-si (KR); Junhyun Park, Suwon-si (KR); Mukyung Jeon, Ulsan (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/798,814

(22) Filed: Aug. 9, 2024

(65) Prior Publication Data

US 2024/0404457 A1 Dec. 5, 2024

Related U.S. Application Data

(63) Continuation of application No. 18/224,079, filed on Jul. 20, 2023, now Pat. No. 12,106,706, which is a (Continued)

(30) Foreign Application Priority Data

Sep. 2, 2021 (KR) ........................ 10-2021-0117014

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01); (Continued)

(58) Field of Classification Search
CPC ....... G09G 3/32–3291; G09G 2300/08; G09G 2300/0809; G09G 2300/0819; (Continued)

(56) References Cited

U.S. PATENT DOCUMENTS

| | | | |
|---|---|---|---|
| 2014/0168194 A1 | 6/2014 | Kong et al. | |
| 2016/0104424 A1 | 4/2016 | Lim et al. | |

(Continued)

FOREIGN PATENT DOCUMENTS

| | | | |
|---|---|---|---|
| CN | 111179850 A | 5/2020 | |
| KR | 10-0560780 B1 | 3/2006 | |

(Continued)

*Primary Examiner* — Nathan Danielsen
(74) *Attorney, Agent, or Firm* — Innovation Counsel LLP

(57) ABSTRACT

A pixel of a display device includes a first transistor including a top gate coupled to a first node, a first terminal, a second terminal coupled to a second node, and a bottom gate, a second transistor including a gate coupled to a writing signal line, a first terminal coupled to a data line, and a second terminal coupled to the first node, a storage capacitor coupled between the first node and the second node, a light emitting element coupled between the second node and a second power supply voltage line, and a seventh transistor including a gate coupled to an initialization signal line, a first terminal coupled to a bias voltage line, and a second terminal coupled to the bottom gate.

20 Claims, 17 Drawing Sheets

Related U.S. Application Data continuation of application No. 17/674,107, filed on Feb. 17, 2022, now Pat. No. 11,756,480.

(52) U.S. Cl.
CPC ............... *G09G 2310/0275* (2013.01); *G09G 2310/061* (2013.01)

(58) Field of Classification Search
CPC ... G09G 2300/0842; G09G 2300/0852; G09G 2300/0861; G09G 2310/0243; G09G 2310/0262; G09G 2310/0267; G09G 2310/0275; G09G 2310/06; G09G 2310/061; G09G 2310/08; G09G 2320/0233; G09G 2320/0252–0266; G09G 2320/0613; G09G 2320/10; G09G 2350/00
See application file for complete search history.

(56) References Cited

U.S. PATENT DOCUMENTS

| | | | | |
|---|---|---|---|---|
| 2017/0018220 | A1 | 1/2017 | Takahara | |
| 2018/0040274 | A1 | 2/2018 | Kurokawa | |
| 2019/0362674 | A1* | 11/2019 | Xu | G09G 3/3241 |
| 2020/0234641 | A1 | 7/2020 | Jeong | |
| 2021/0074217 | A1 | 3/2021 | Lee et al. | |
| 2021/0142733 | A1 | 5/2021 | Kim et al. | |
| 2021/0201790 | A1 | 7/2021 | Gai et al. | |
| 2021/0272521 | A1 | 9/2021 | Yoon et al. | |
| 2022/0189403 | A1 | 6/2022 | Kang et al. | |

FOREIGN PATENT DOCUMENTS

| | | | |
|---|---|---|---|
| KR | 10-2021-0029330 | A | 3/2021 |
| KR | 10-2715248 | B1 | 10/2024 |
| TW | 200926106 | A | 6/2009 |

* cited by examiner

PIXEL OF A DISPLAY DEVICE, AND DISPLAY DEVICE

CROSS-REFERENCE TO RELATED APPLICATION(S)

This application is a continuation application of U.S. patent application Ser. No. 18/224,079 filed on Jul. 20, 2023, which is a continuation application of U.S. patent application Ser. No. 17/674,107 filed on Feb. 17, 2022, now U.S. Pat. No. 11,756,480, which claims priority under 35 USC § 119 to Korean Patent Application No. 10-2021-0117014, filed on Sep. 2, 2021, in the Korean Intellectual Property Office (KIPO), the content of which is incorporated by reference herein in their entireties.

BACKGROUND

1. Field

Embodiments of the present inventive concept relate to a display device, and more particularly to a pixel of a display device, and the display device.

2. Description of the Related Art

A display device may generally display an image at a constant frame rate (or a constant frame frequency) of about 60 Hz, about 120 Hz, about 240 Hz, or the like. However, a frame rate of rendering by a host processor (e.g., a graphics processing unit (GPU), an application processor (AP) or a graphics card) providing frame data to the display device may be different from the frame rate (or a refresh rate) of the display device. In particular, when the host processor provides the display device with frame data for a game image (gaming image) that requires complicated rendering, the frame rate mismatch may be intensified, and a tearing phenomenon may occur where a boundary line is caused by the frame rate mismatch in an image of the display device.

To prevent or reduce the tearing phenomenon, a variable frame mode (e.g., Free-Sync, G-Sync, Q-sync, etc.) has been developed in which a host processor provides frame data to a display device at a variable frame rate (or a variable frame frequency) by changing a time length (or a duration of time) of a blank period in each frame period. A display device supporting the variable frame mode may display an image in synchronization with the variable frame rate, thereby reducing or preventing the tearing phenomenon.

In the display device operating in the variable frame mode, a display panel may be driven at the variable frame rate, or a variable driving frequency. However, a luminance of the display panel may not be uniform at the variable driving frequency or different driving frequencies.

SUMMARY

Some embodiments provide a pixel of a display device capable of having a substantially constant luminance at a variable driving frequency.

Some embodiments provide a display device capable of having a substantially constant luminance at a variable driving frequency.

According to embodiments, there is provided a pixel of a display device including a first transistor including a top gate coupled to a first node, a first terminal, a second terminal coupled to a second node, and a bottom gate, a second transistor including a gate coupled to a writing signal line, a first terminal coupled to a data line, and a second terminal coupled to the first node, a storage capacitor coupled between the first node and the second node, a light emitting element coupled between the second node and a second power supply voltage line, and a seventh transistor including a gate coupled to an initialization signal line, a first terminal coupled to a bias voltage line, and a second terminal coupled to the bottom gate of the first transistor.

In embodiments, the pixel may further include a fourth transistor including a gate coupled to the initialization signal line, a first terminal coupled to an initialization voltage line, and a second terminal coupled to the second node, a fifth transistor including a gate coupled to an emission signal line, a first terminal coupled to a first power supply voltage line, and a second terminal coupled to the first terminal of the first transistor, and a sixth transistor including a gate coupled to the emission signal line, a first terminal coupled to the bottom gate of the first transistor, and a second terminal coupled to the second node.

In embodiments, the pixel may further include a holding capacitor configured to hold a voltage of the second node.

In embodiments, the holding capacitor may include a first electrode coupled to the line of the first power supply voltage line, and a second electrode coupled to the bottom gate of the first transistor, and the light emitting element may include an anode coupled to the second node and a cathode coupled to the second power supply voltage line.

In embodiments, the holding capacitor may include a first electrode coupled to a direct current (DC) voltage line, and a second electrode coupled to the bottom gate of the first transistor.

In embodiments, the holding capacitor may include a first electrode coupled to the second node, and a second electrode coupled to the second power supply voltage line.

In embodiments, the holding capacitor may include a first electrode coupled to the second node and a second electrode coupled to a line of a DC voltage.

In embodiments, the pixel may further include a third transistor including a gate coupled to a reset signal line, a first terminal coupled to a reference voltage line, and a second terminal coupled to the first node.

In embodiments, the first through seventh transistors may be implemented as n-type metal oxide semiconductor (NMOS) transistors.

In embodiments, the first through seventh transistors may have dual gate structures.

In embodiments, each frame period for the pixel may include an initialization period in which the first node and the second node are initialized, a compensation period in which a threshold voltage of the first transistor is compensated, a data writing period in which a data voltage of the data line is written, at least one bias period in which the second node is initialized and a bias voltage of the bias voltage line is applied to the bottom gate of the first transistor, and at least one emission period in which the light emitting element emits light.

In embodiments, in the initialization period, the emission signal line and the writing signal line have a turn-off level, the reset signal line has a turn-on level to apply a reference voltage to the first node, and the initialization signal line has the turn-on level to apply an initialization voltage of the initialization voltage line to the second node In embodiments, in the compensation period, the initialization signal line and the writing signal line have a turn-off level, the reset signal line has a turn-on level to apply the reference voltage to the first node, the emission signal line has the turn-on level, and the voltage of the second node is saturated to a voltage corresponding to the threshold voltage subtracted from the reference voltage.

In embodiments, in the data writing period, the emission signal, the emission signal line, the initialization signal line and the reset signal line have a turn-off level, and the writing signal line has a turn-on level to apply the data voltage to the first node.

In embodiments, in the bias period, the emission signal line, the reset signal line and the writing signal line have a turn-off level, the initialization signal line has a turn-on level, the fourth transistor is turned on in response to an initialization signal of the initialization signal line having the turn-on level to apply the initialization voltage to the second node, the sixth transistor separates the bottom gate of the first transistor from the second node in response to an emission signal of the emission signal line having the turn-off level, and the seventh transistor is turned on in response to the initialization signal to apply the bias voltage to the bottom gate of the first transistor.

In embodiments, in the emission period, the initialization signal line, the reset signal line and the writing signal line have a turn-off level, the emission signal line has a turn-on level, the first transistor is turned on based on the data voltage, the fifth transistor is turned on in response to an emission signal of the emission signal line having the turn-on level, and the light emitting element emits the light.

According to embodiments, there is provided a pixel of a display device including a first transistor including a top gate coupled to a first node, a first terminal, a second terminal coupled to a second node, and a bottom gate, a second transistor including a gate receiving a writing signal, a first terminal coupled to a data line, and a second terminal coupled to the first node, a storage capacitor including a first electrode coupled to the first node and a second electrode coupled to the second node, a third transistor including a gate receiving a reset signal, a first terminal coupled to a reference voltage line, and a second terminal coupled to the first node, a fourth transistor including a gate receiving an initialization signal, a first terminal coupled to an initialization voltage line, and a second terminal coupled to the second node, a fifth transistor including a gate receiving an emission signal, a first terminal coupled to a first power supply voltage line, and a second terminal coupled to the first terminal of the first transistor, a holding capacitor including a first electrode coupled to the first power supply voltage line and a second electrode coupled to the bottom gate of the first transistor, a light emitting element including an anode coupled to the second node and a cathode coupled to a second power supply voltage line, a sixth transistor including a gate receiving the emission signal, a first terminal coupled to the bottom gate of the first transistor, and a second terminal coupled to the second node, and a seventh transistor including a gate coupled to an initialization signal line, a first terminal coupled to a bias voltage line, and a second terminal coupled to the bottom gate of the first transistor.

According to embodiments, there is provided a display device including a display panel including a plurality of pixels, a data driver configured to provide a data voltage to each of the plurality of pixels, a scan driver configured to provide a writing signal, a reset signal and an initialization signal to each of the plurality of pixels, an emission driver configured to provide an emission signal to each of the plurality of pixels, and a controller configured to control the data driver, the scan driver and the emission driver. Each of the plurality of pixels includes a first transistor including a top gate coupled to a first node, a first terminal, a second terminal coupled to a second node, and a bottom gate, a second transistor including a gate coupled to a writing signal line, a first terminal coupled to a data line, and a second terminal coupled to the first node, a storage capacitor coupled between the first node and the second node, a fourth transistor configured to apply an initialization voltage to the second node in response to the initialization signal, a fifth transistor configured to couple a line of a first power supply voltage and the first terminal of the first transistor in response to the emission signal, a holding capacitor configured to hold a voltage of the second node, a light emitting element coupled between the second node and a second power supply voltage line, a sixth transistor configured to selectively couple the bottom gate of the first transistor and the second node in response to the emission signal, and a seventh transistor configured to apply a bias voltage to the bottom gate of the first transistor in response to the initialization signal.

In embodiments, the scan driver may provide the writing signal and the reset signal to each of the plurality of pixels at a first frequency, and may provide the initialization signal to each of the plurality of pixels at a second frequency different from the first frequency. The emission driver may provide the emission signal to each of the plurality of pixels at the second frequency.

In embodiments, the first frequency may be a variable frequency, and the second frequency may be a fixed frequency.

As described above, in a pixel of a display device and the display device according to embodiments, a sixth transistor may separate a bottom gate of a first transistor from a second node (e.g., a source node), and a seventh transistor may apply a bias voltage to the bottom gate of the first transistor. Accordingly, in the pixel according to embodiments, a hysteresis of the first transistor may be compensated without affecting the second node. Further, the hysteresis of the first transistor may be periodically compensated, and thus a luminance of a display panel including the pixel may be uniform at different driving frequencies.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
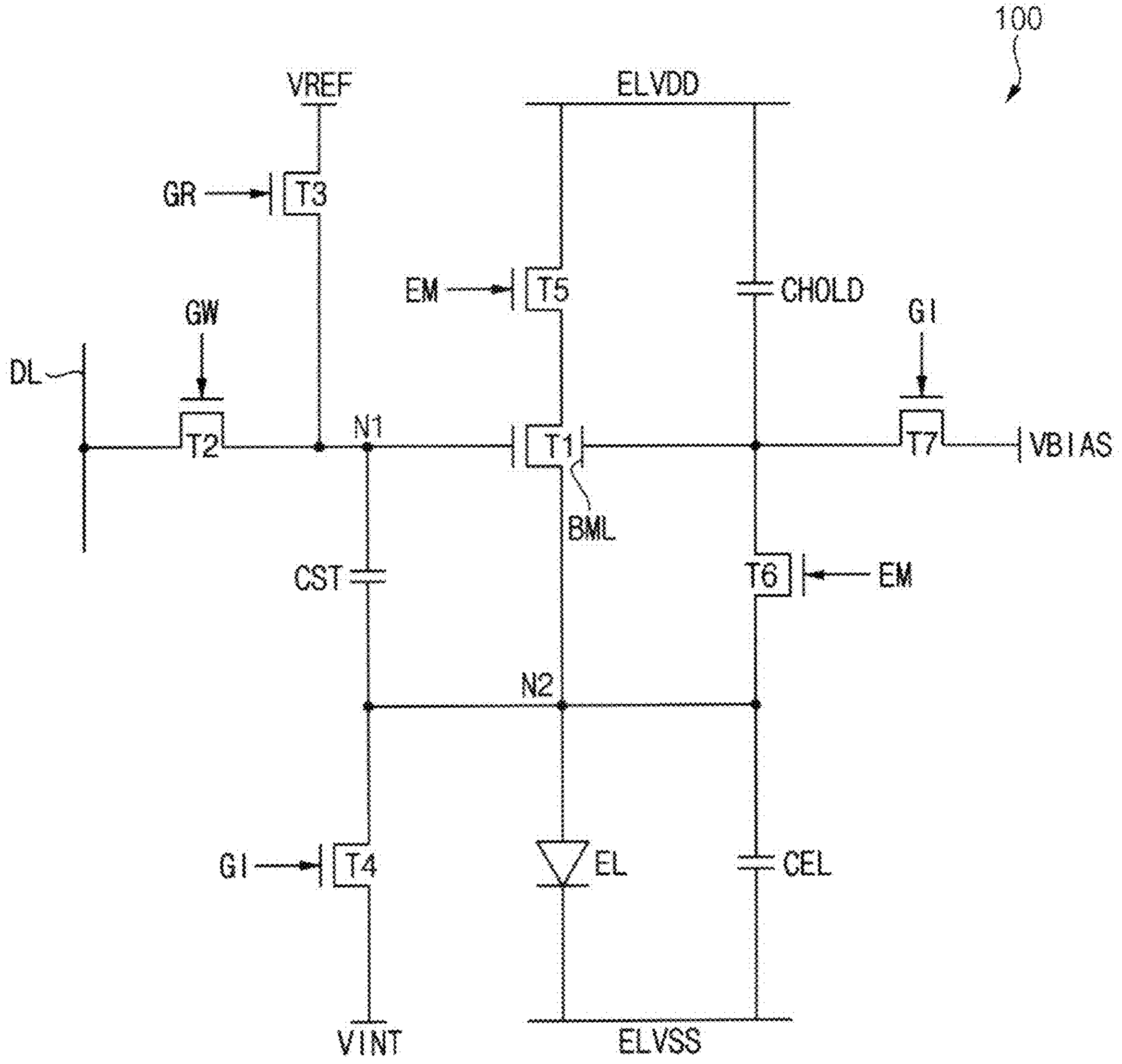
FIG. 1 is a circuit diagram illustrating a pixel of a display device according to embodiments.

FIG. 1 is a circuit diagram illustrating a pixel of a display device according to embodiments.

Referring to FIG. 1, a pixel 100 according to embodiments may include a first transistor T1, a second transistor T2, a storage capacitor CST, a fourth transistor T4, a fifth transistor T5, a holding capacitor CHOLD, a light emitting element EL, a diode capacitor CEL, a sixth transistor T6 and a seventh transistor T7. In some embodiments, the pixel 100 may further include a third transistor T3.

The first transistor T1 may generate a driving current based on a voltage between a first node N1 and a second node N2, or a voltage stored in the storage capacitor CST. In some embodiments, the first node N1 may be a gate node coupled to a gate of the first transistor T1. Further, in some embodiments, the second node N2 may be a source node coupled to a source of the first transistor T1. The first transistor T1 may be referred to as a driving transistor for generating the driving current. In some embodiments, the first transistor T1 may include a top gate coupled to the first node N1, a first terminal coupled to the fifth transistor T5, a second terminal coupled to the second node N2, and a bottom gate BML coupled to the holding capacitor CHOLD, the sixth transistor T6 and the seventh transistor T7. Thus, the first transistor T1 may have a dual gate structure including the top gate and the bottom gate BML. In some embodiments, the bottom gate BML of the first transistor T1 may be referred to as a bottom metal layer. Since the first transistor T1 includes the bottom gate BML and the bottom gate BML may be maintained to have a substantially constant voltage by the holding capacitor CHOLD, a driving characteristic of the first transistor T1 may be improved. For example, a drain-source current of the first transistor T1 according to a drain-source voltage of the first transistor T1 may become substantially uniform.

The second transistor T2 may apply a data voltage of a data line DL to the first node N1 in response to a writing signal GW. The second transistor T2 may be referred to as a scan transistor for transferring the data voltage of the data line DL to the first node N1. In some embodiments, the second transistor T2 may include a gate receiving the writing signal GW, a first terminal coupled to the data line DL, and a second terminal coupled to the first node N1.

The third transistor T3 may apply a reference voltage VREF to the first node N1 in response to a reset signal GR. The third transistor T3 may be referred to as a reset transistor for applying the reference voltage VREF to the first node N1. In some embodiments, the third transistor T3 may include a gate receiving the reset signal GR, a first terminal coupled to a line of the reference voltage VREF, and a second terminal coupled to the first node N1.

The storage capacitor CST may store the data voltage transferred through the second transistor T2 from the data line DL. The storage capacitor CST may be couple between the first node N1 and the second node N2. In some embodiments, the storage capacitor CST may include a first electrode coupled to the first node N1 and a second electrode coupled to the second node N2.

The fourth transistor T4 may apply an initialization voltage VINT to the second node N2 in response to an initialization signal GI. The fourth transistor T4 may be referred to as an initialization transistor for initializing the second node N2. In some embodiments, the fourth transistor T4 may include a gate receiving the initialization signal GI, a first terminal coupled to a line of the initialization voltage VINT, and a second terminal coupled to the second node N2.

The fifth transistor T5 may selectively couple a line of a first power supply voltage ELVDD to the first terminal of the first transistor T1 in response to an emission signal EM. The fifth transistor T5 may be referred to as an emission transistor for generating a current path from the line of the first power supply voltage ELVDD to a line of a second power supply voltage ELVSS. In some embodiments, the fifth transistor T5 may include a gate receiving the emission signal EM, a first terminal coupled to the line of the first power supply voltage ELVDD and a second terminal coupled to the first terminal of the first transistor T1.

The holding capacitor CHOLD may be a capacitor for holding a voltage of the second node N2. The holding capacitor CHOLD may be coupled to the second node N2 through the sixth transistor T6. For example, the holding capacitor CHOLD may be coupled between the line of the first power supply voltage ELVDD and the sixth transistor T6. In some embodiments, the holding capacitor CHOLD may include a first electrode coupled to the line of the first power supply voltage ELVDD and a second electrode coupled to the bottom gate BML of the first transistor T1 and a first terminal of the sixth transistor T6.

The light emitting element EL may emit light based on the driving current generated by the first transistor T1. In some embodiments, the light emitting element EL may be, but not limited to, an organic light emitting diode (OLED). In other embodiments, the light emitting element EL may be any suitable light emitting diode. For example, the light emitting element EL may be a nano light emitting diode (NED), a quantum dot (QD) light emitting diode, a micro light emitting diode, an inorganic light emitting diode, or any other suitable light emitting element. In some embodiments, the light emitting element EL may include an anode coupled to the second node N2 and a cathode coupled to the line of the second power supply voltage ELVSS.

The diode capacitor CEL may be coupled between the second node N2 and the line of the second power supply voltage ELVSS. In some embodiments, the diode capacitor CEL may be a parasitic capacitor of the light emitting element EL.

The sixth transistor T6 may selectively couple the bottom gate BML of the first transistor T1 and the second node N2 in response to the emission signal EM. The sixth transistor T6 may be referred to as a switching transistor for selectively couple the bottom gate BML of the first transistor T1 and the second node N2. For example, while a bias voltage VBIAS is applied to the bottom gate BML of the first transistor T1, the sixth transistor T6 may be turned off to separate the bottom gate BML of the first transistor T1 from the second node N2. Accordingly, the bias voltage VBIAS may be applied to the bottom gate BML of the first transistor T1 without affecting the second node N2. In some embodiments, the sixth transistor T6 may include a gate receiving the emission signal EM, a first terminal coupled to the bottom gate BML of the first transistor T1, and a second terminal coupled to the second node N2.

The seventh transistor T7 may apply the bias voltage VBIAS to the bottom gate BML of the first transistor T1 in response to the initialization signal GI. The seventh transistor T7 may be referred to as a bias transistor for applying a bias voltage VBIAS to the bottom gate BML of the first transistor T1. In some embodiments, even if a display panel including the pixel 100 is driven at a variable driving frequency, the initialization signal GI may be applied to the pixel 100 at a substantially constant (or fixed) frequency (e.g., about 480 Hz), and thus the seventh transistor T7 may periodically apply the bias voltage VBIAS to the bottom gate BML of the first transistor T1 at the substantially constant frequency. That is, even if the display panel is driven at the variable driving frequency, the bias may be applied to the first transistor T1 at the substantially constant frequency. In some embodiments, the seventh transistor T7 may include a gate receiving the initialization signal GI, a first terminal coupled to a line of the bias voltage VBIAS, and a second terminal coupled to the bottom gate BML of the first transistor T1.

In some embodiments, the bias voltage VBIAS may have a voltage level corresponding to an on-bias for turning on the first transistor T1. If the bias voltage VBIAS, or the on-bias is applied to the bottom gate BML of the first transistor T1, the first transistor T1 may be turn-on to have a substantially constant driving characteristic and a hysteresis of the first transistor T1 may be reset or compensated.

In other embodiments, the bias voltage VBIAS may have a voltage level corresponding to an off-bias for turning off the first transistor T1. In this case, if the bias voltage VBIAS, or the off-bias is applied to the bottom gate BML of the first transistor T1, the first transistor T1 may be turn-off to have a substantially constant driving characteristic and the hysteresis of the first transistor T1 may be reset or compensated.

In some embodiments, as illustrated in FIG. 1, the first through seventh transistors T1 through T7 may be implemented as, but not limited to, n-type metal oxide semiconductor (NMOS) transistors. In other embodiments, a portion or all of the first through seventh transistors T1 through T7 may be implemented as p-type metal oxide semiconductor (PMOS) transistors.

A driving characteristic of the first transistor T1 may be changed according to a previous stage of the first transistor T1 and may be changed while the pixel 100 emits light. Thus, in a conventional display device, when a display panel is driven at a variable driving frequency, a luminance of a pixel may be changed according to a driving frequency of the display panel. That is, a luminance of a pixel in a first case where the display panel is driven at a relatively high driving frequency and each frame period is relatively short may be different from a luminance of a pixel in a second case where the display panel is driven at a relatively low driving frequency and each frame period is relatively long. By this luminance difference, a flicker may occur in the conventional display device.

However, in the pixel 100 according to embodiments, even if a display panel including the pixel 100 is driven at a variable driving frequency, the seventh transistor T7 may periodically apply the bias voltage VBIAS to the bottom gate BML of the first transistor T1 at the substantially constant frequency. Accordingly, the bias may be periodically applied to the first transistor T1, the hysteresis of the first transistor T1 may be periodically compensated, and thus the pixel 100 and the display panel may have a substantially uniform luminance even if a driving frequency of the display panel is changed.

Figure 2:
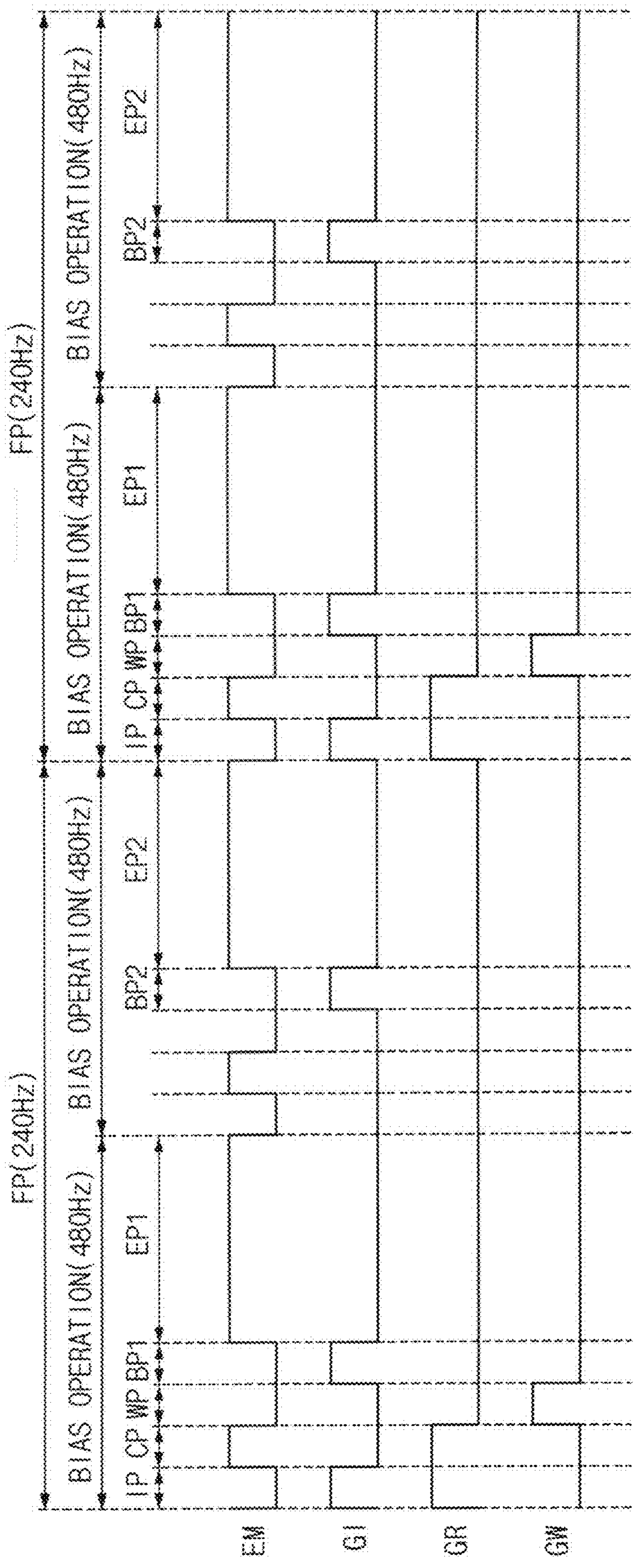
FIG. 2 is a timing diagram for describing an example of an operation of a pixel included in a display panel driven at a driving frequency of about 240 Hz.
Figure 3:
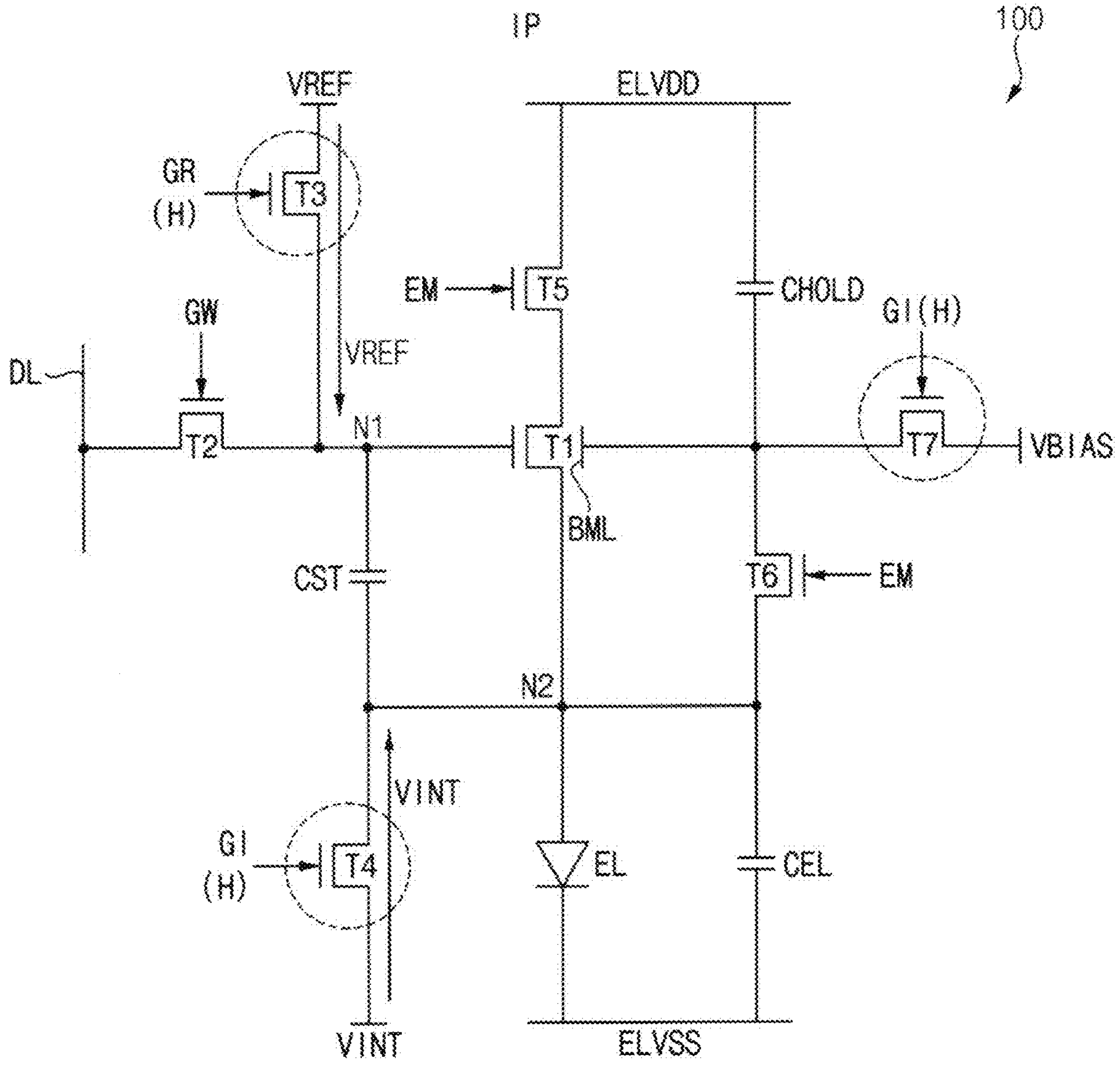
FIG. 3 is a circuit diagram for describing an example of an operation of a pixel in an initialization period.
Figure 4:
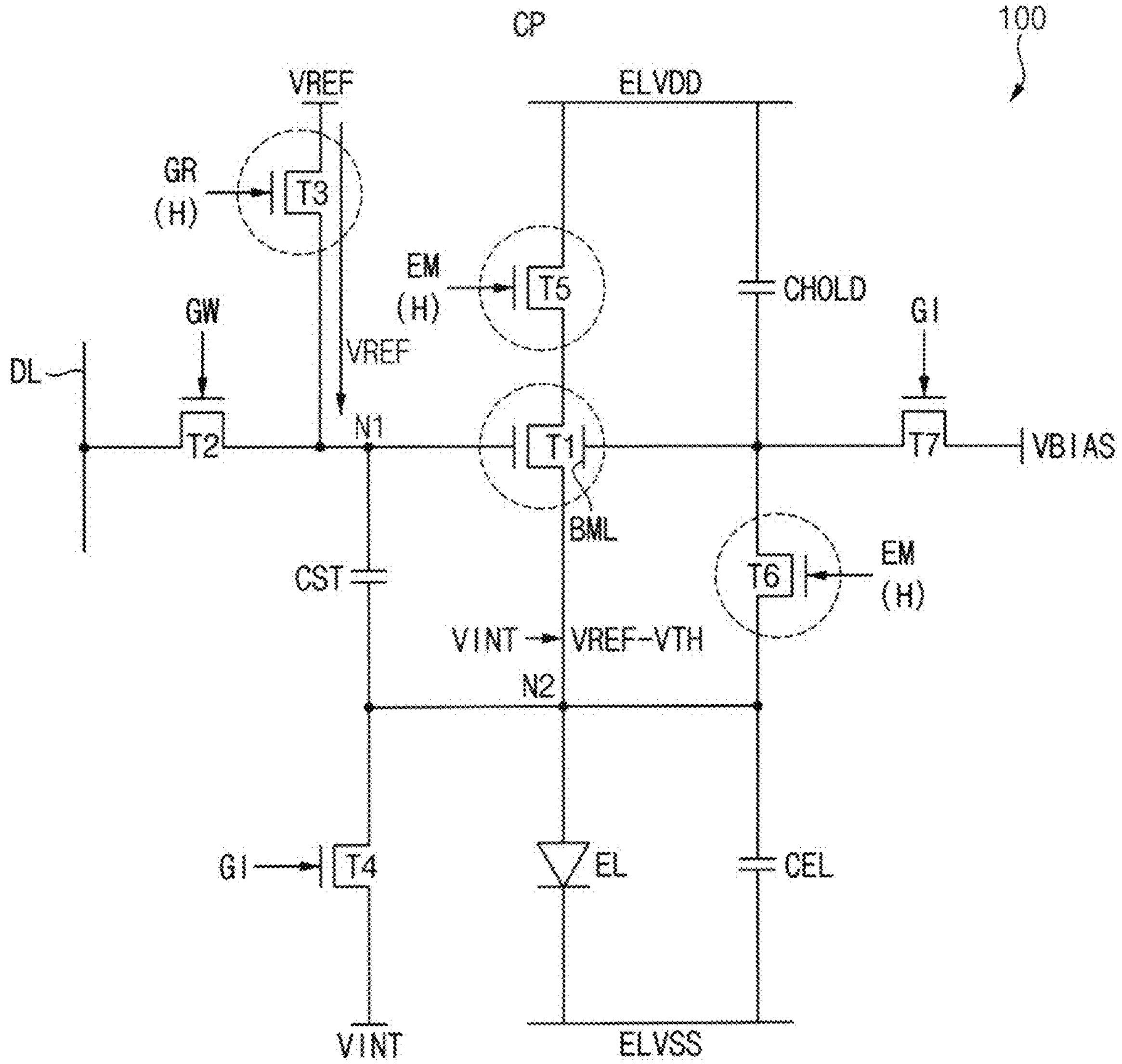
FIG. 4 is a circuit diagram for describing an example of an operation of a pixel in a compensation period.
Figure 5:
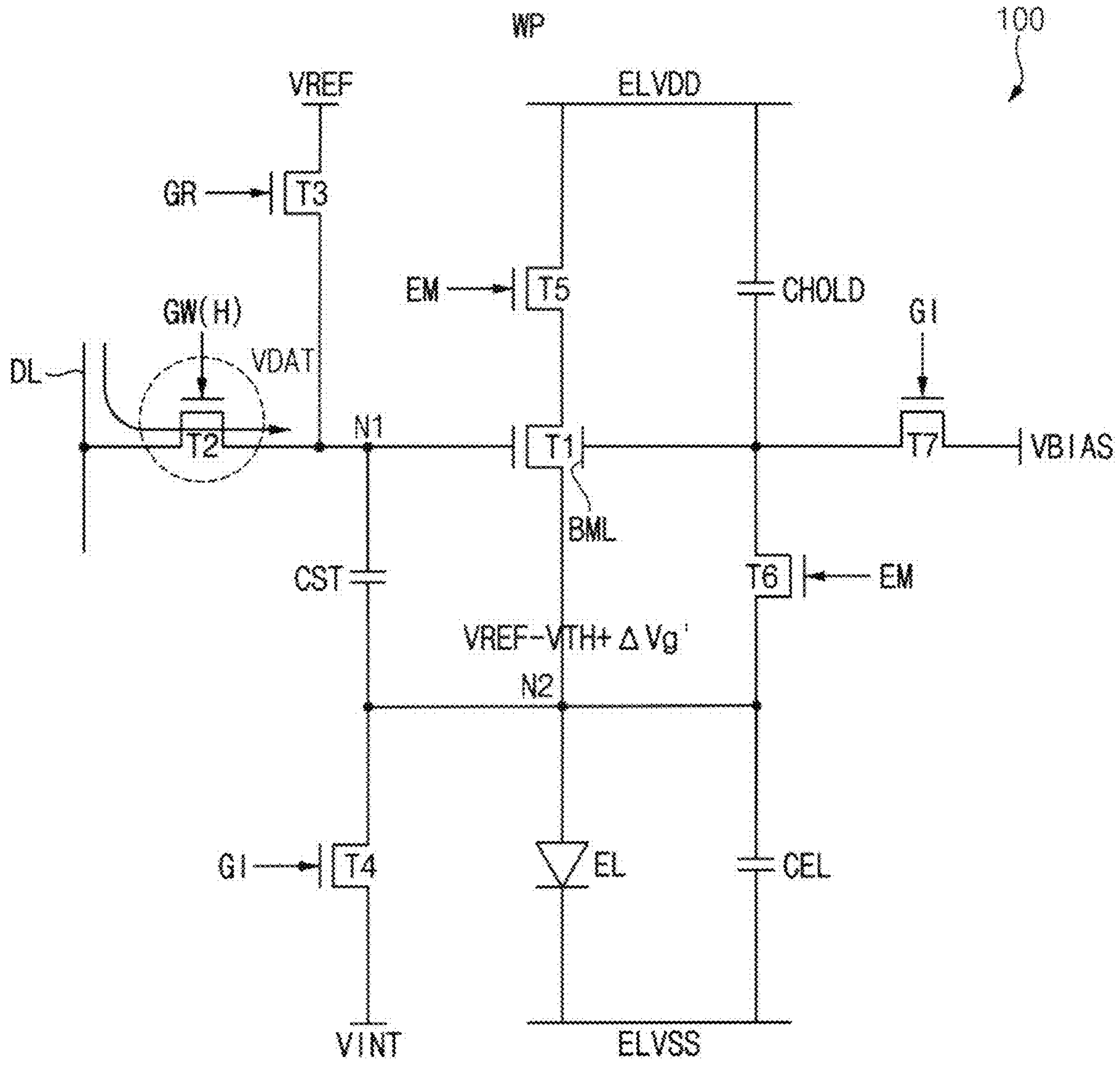
FIG. 5 is a circuit diagram for describing an example of an operation of a pixel in a data writing period.
Figure 6:
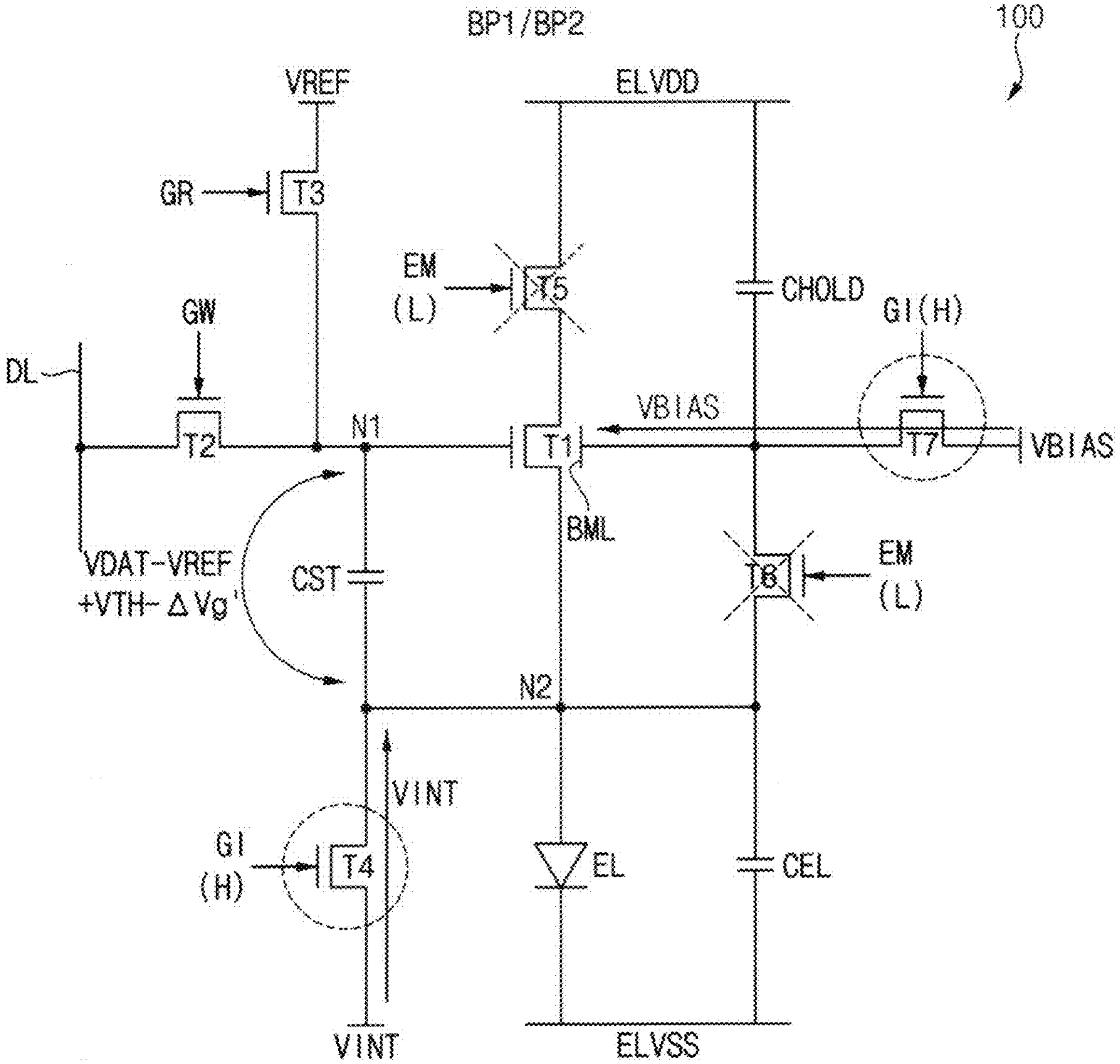
FIG. 6 is a circuit diagram for describing an example of an operation of a pixel in each bias period.
Figure 7:
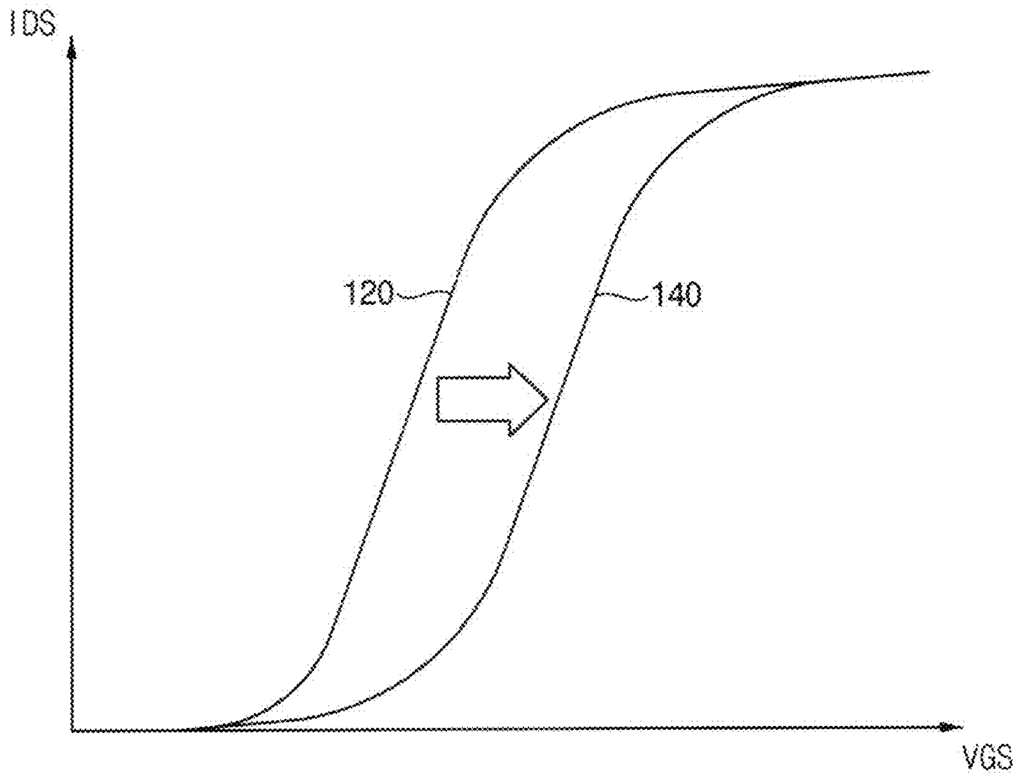
FIG. 7 is a diagram illustrating an example of a driving characteristic of a first transistor.
Figure 8:
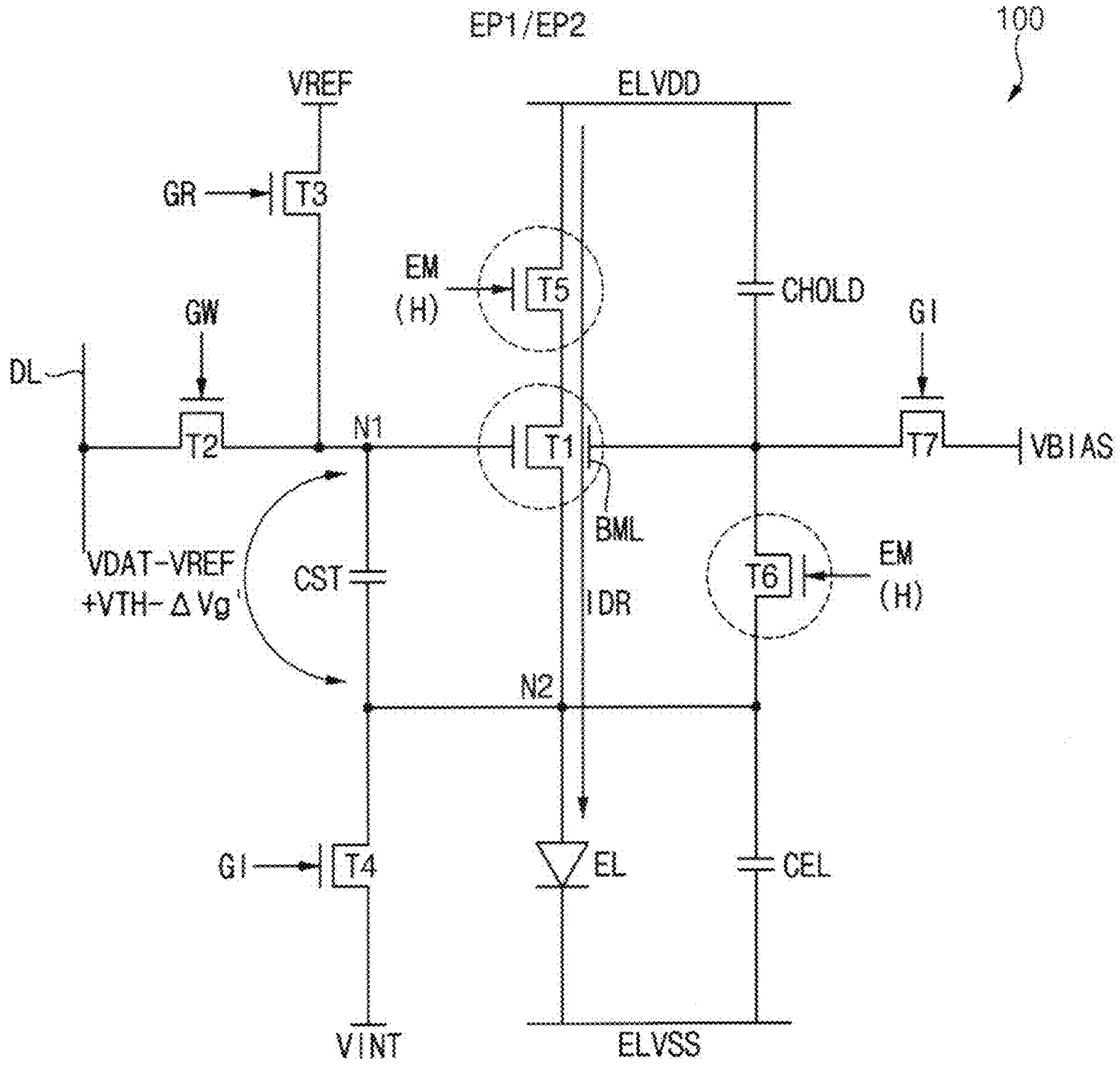
FIG. 8 is a circuit diagram for describing an example of an operation of a pixel in each emission period.
Figure 9:
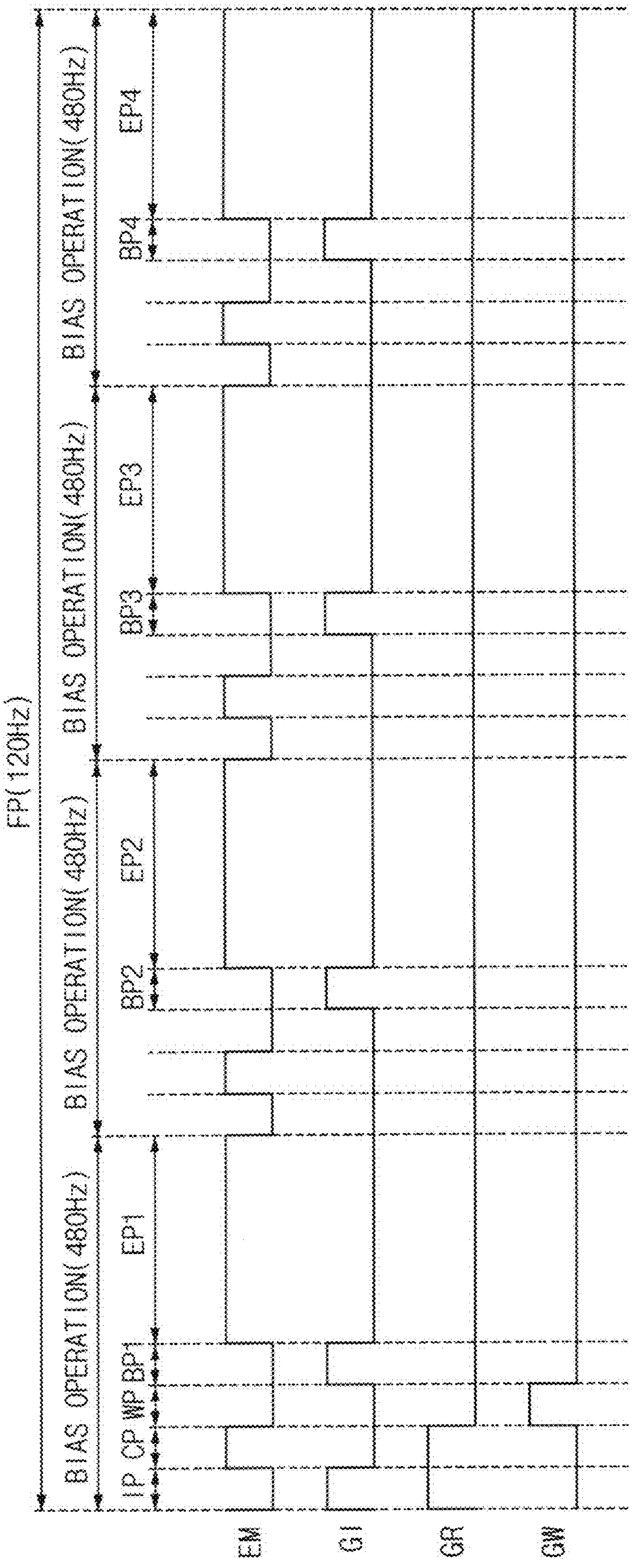
FIG. 9 is a timing diagram for describing an example of an operation of a pixel included in a display panel driven at a driving frequency of about 120 Hz.

FIG. 2 is a timing diagram for describing an example of an operation of a pixel included in a display panel driven at a driving frequency of about 240 Hz, FIG. 3 is a circuit diagram for describing an example of an operation of a pixel in an initialization period, FIG. 4 is a circuit diagram for describing an example of an operation of a pixel in a compensation period, FIG. 5 is a circuit diagram for describing an example of an operation of a pixel in a data writing period, FIG. 6 is a circuit diagram for describing an example of an operation of a pixel in each bias period, FIG. 7 is a diagram illustrating an example of a driving characteristic of a first transistor, FIG. 8 is a circuit diagram for describing an example of an operation of a pixel in each emission period, and FIG. 9 is a timing diagram for describing an example of an operation of a pixel included in a display panel driven at a driving frequency of about 120 Hz.

Referring to FIGS. 1 and 2, each frame period FP for a pixel 100 may include an initialization period IP, a compensation period CP, a data writing period WP, at least one bias period BP1 and BP2 and at least one emission period EP1 and EP2. Although FIG. 2 illustrates an example where each frame period FP includes two bias periods BP1 and BP2 and two emission periods EP1 and EP2, the frame period FP for the pixel 100 according to embodiments is not limited to the example of FIG. 2. For example, each frame period FP may include one bias period and one emission period, or may include three or more bias periods and three or more emission periods.

In the initialization period IP, a first node N1 and a second node N2 may be initialized. As illustrated in FIGS. 2 and 3, in the initialization period IP, an emission signal EM and a writing signal GW may have a low level, and an initialization signal GI and a reset signal GR may have a high level H. A third transistor T3 may be turned on in response to the reset signal GR having the high level H to apply a reference voltage VREF to the first node N1, and a fourth transistor T4 may be turned on in response to the initialization signal GI having the high level H to apply an initialization voltage VINT to the second node N2. Accordingly, the first node N1 may be initialized to have the reference voltage VREF, and the second node N2 may be initialized to have the initialization voltage VINT. Further, a seventh transistor T7 may be turned on in response to the initialization signal GI having the high level H to apply the bias voltage VBIAS to the bottom gate BML of the first transistor T1.

In the compensation period CP, a threshold voltage of a first transistor T1 may be compensated. As illustrated in FIGS. 2 and 4, in the compensation period CP, the initialization signal GI and the writing signal GW may have the low level, and the emission signal EM and the reset signal GR may have the high level H. The third transistor T3 may be turned on in response to the reset signal GR having the high level H to apply the reference voltage VREF to the first node N1, and a fifth transistor T5 may be turned on in response to the emission signal EM having the high level H. If the reference voltage VREF is applied to the first node N1, or a gate of the first transistor T1, and the fifth transistor T5 is turned on, the first transistor T1 may be turned on. Further, the first transistor T1 may be turned on until a voltage of the second node N2 becomes a voltage corresponding to the threshold voltage VTH of the first transistor T1 subtracted from the reference voltage VREF. Accordingly, in the compensation period CP, the voltage of the second node N2 may be changed from the initialization voltage VINT to a voltage VREF-VTH, or may be saturated to the voltage VREF-VTH. Thus, the threshold voltage VTH of the first transistor T1 may be stored in a storage capacitor CST. An operation that stores the threshold voltage VTH of the first transistor T1 in the storage capacitor CST may be referred to as a compensation operation for compensating the threshold voltage VTH of the first transistor T1. Further, a sixth transistor T6 may be turned on in response to the emission signal EM having the high level H.

In the data writing period WP, a data voltage of a data line DL may be written to the pixel 100. As illustrated in FIGS. 2 and 5, in the data writing period WP, the emission signal EM, the initialization signal GI and the reset signal GR may have the low level, and the writing signal GW may have the high level H. The second transistor T2 may be turned on in response to the writing signal GW having the high level H to apply the data voltage VDAT of the data line DL to the first node N1. Accordingly, the storage capacitor CST may store the data voltage VDAT. If a voltage of the first node N1, or a voltage of the first electrode of the storage capacitor CST is changed by "VDAT-VREF" from the reference voltage VREF to the data voltage VDAT, a voltage of the second electrode of the storage capacitor CST, or the voltage of the second node N2 may be changed by a voltage change amount ΔVg' that is determined based on a voltage change amount of the first node N1 and capacitors CST, CHOLD and CEL of the pixel 100. For example, the voltage change amount ΔVg' of the second node N2 may be determined as, but not limited to, "(VDAT−VREF)*(CHOLD+CEL)/(CST+CHOLD+CEL)". As described above, if the voltage of the first node N1 becomes the data voltage VDAT, and the voltage of the second node N2 becomes "VREF−VTH+ΔVg", a gate-source voltage (VGS) of the first transistor T1 may become "VDAT−VREF+VTH−ΔVg'". Since the gate-source voltage (VGS) of the first transistor T1 includes the threshold voltage VTH of the first transistor T1, and a driving current of the first transistor T1 is determined based on the gate-source voltage (VGS) minus the threshold voltage VTH, the driving current of the first transistor T1 may be determined regardless of the threshold voltage VTH of the first transistor T1. Further, since the voltage change amount ΔVg' of the second node N2 is determined by the data voltage VDAT, the reference voltage VREF and the capacitors CST, CHOLD and CEL, and the reference voltage VREF and capacitances of the capacitors CST, CHOLD and CEL have previously known values, the voltage change amount ΔVg' of the second node N2 may be previously calculated at respective gray levels. Accordingly, the data voltage VDAT may be set by considering the reference voltage VREF and the previously calculated voltage change amount ΔVg' of the second node N2, and thus the gate-source voltage (VGS) of the first transistor T1 may correspond to a sum of a voltage corresponding to each gray level and the threshold voltage VTH.

In each bias period BP1 and BP2, the second node N2 may be initialized, and a bias voltage VBIAS may be applied to a bottom gate BML of the first transistor T1. As illustrated in FIGS. 2 and 6, in the bias period BP1 and BP2, the emission signal EM, the reset signal GR and the writing signal GW may have the low level, and the initialization signal GI may have the high level H. The fourth transistor T4 may be turned on in response to the initialization signal GI having the high level H to apply the initialization voltage VINT to the second node N2. Thus, the second node N2 may be initialized to the initialization voltage VINT. The first node N1 may be floated while the initialization voltage VINT is applied to the second node N2, and thus a voltage between the first and second electrodes of the storage capacitor CST, or the gate-source voltage of the first transistor T1 may be maintained as "VDAT−VREF+VTH−ΔVg'". Further, the sixth transistor T6 may separate the bottom gate BML of the first transistor T1 from the second node N2 in response to the emission signal EM having the low level, and the seventh transistor T7 may be turned on in response to the initialization signal GI having the high level H to apply the bias voltage VBIAS to the bottom gate BML of the first transistor T1. Accordingly, in the bias period BP1 and BP2, since the bias voltage VBIAS is applied to the bottom gate BML of the first transistor T1, or a bias is applied to the first transistor T1, a hysteresis of the first transistor T1 may be compensated.

For example, as illustrated in FIG. 7, when the first transistor T1 is turned on, the first transistor T1 may have a first driving characteristic 120 for a drain-source current IDS according to a gate-source voltage VGS. Thereafter, a driving characteristic of the first transistor T1 may be gradually changed from the first driving characteristic 120 to a second driving characteristic 140. By this change of the driving characteristic of the first transistor T1, luminances of the pixel 100 and a display panel may be changed according to a driving frequency of the display panel. However, in the pixel 100 according to embodiments, since the bias voltage VBIAS is applied to the bottom gate BML of the first transistor T1 in the bias period BP1 and BP2, or the bias is applied to the first transistor T1 in the bias period BP1 and BP2, the driving characteristic of the first transistor T1 may be recovered to the first driving characteristic 120, and the hysteresis of the first transistor T1 may be compensated. Accordingly, the pixel 100 and a display panel including the pixel 100 may have a substantially uniform luminance at different driving frequencies.

Further, in the bias period BP1 and BP2, since the second node N2 is separated from the bottom gate BML of the first transistor T1, the hysteresis of the first transistor T1 may be compensated without affecting the second node N2. In some embodiments, an operation that applies the bias to the first transistor T1 may be referred to as a bias operation.

In each emission period EP1 and EP2, a light emitting element EL may emit light. As illustrated in FIGS. 2 and 8, in the emission period EP1 and EP2, the initialization signal GI, the reset signal GR and the writing signal GW may have the low level, and the emission signal EM may have the high level H. The first transistor T1 may be turned on to generate a driving current IDR based on the voltage VDAT-VREF+VTH-ΔVg' stored in the storage capacitor CST, and the fifth transistor T5 may be turned on in response to the emission signal EM having the high level H to form a path of the driving current IDR from a line of a first power supply voltage ELVDD to a line of a second power supply voltage ELVSS. Since the voltage VDAT-VREF+VTH-ΔVg' stored in the storage capacitor CST includes the threshold voltage VTH of the first transistor T1, the driving current IDR generated by the first transistor T1 may be determined regardless of the threshold voltage VTH of the first transistor T1. The light emitting element EL may emit the light based on the driving current IDR generated by the first transistor T1. Further, the sixth transistor T6 may be turned on in response to the emission signal EM having the high level H.

Although FIG. 2 illustrates an example where the frame period FP corresponds to a frequency of about 240 Hz, or has a time length of about 4.2 ms, a frequency or a time length of the frame period FP for the pixel 100 according to embodiments is not limited to the example of FIG. 2. For example, the frame period FP may correspond to a frequency of about 160 Hz, about 120 Hz, about 96 Hz, about 80 Hz, about 68 Hz, about 60 Hz, or the like.

In some embodiments, the display panel including the pixel 100 may be driven at a variable driving frequency. For example, a display device including the pixel 100 may receive input image data at a variable input frame frequency from a host processor (e.g., a graphics processing unit (GPU), an application processor (AP) or a graphics card). In this case, the display device may drive the display panel at the variable driving frequency corresponding to the variable input frame frequency. Further, in some embodiments, the variable driving frequency of the display panel may be determined as one of divisors of a frequency of the bias operation in each frame period FP. For example, in a case where the frequency of the bias operation is about 480 Hz as illustrated in FIG. 2, a time length of each frame period FP of the display panel may be determined as one of time lengths of divisors of about 480 Hz, for example about 4.2 ms corresponding to about 240 Hz, about 6.3 ms corresponding to about 160 Hz, about 8.3 ms corresponding to about 120 Hz, about 10.4 ms corresponding to about 96 Hz, about 12.5 ms corresponding to about 80 Hz, about 14.7 ms corresponding to about 68 Hz, about 16.7 ms corresponding to about 60 Hz, or the like. Further, the time length of the frame period FP may be changed in each frame period FP.

Even if the driving frequency of the display panel is changed in each frame period FP, the bias operation for the pixel 100 may be performed at the substantially constant frequency. For example, in a case where the driving frequency of the display panel is changed from about 240 Hz as illustrated in FIG. 2 to about 120 Hz as illustrated in FIG. 9, the time length of the frame period may be changed from about 4.2 ms corresponding to about 240 Hz to about 8.3 ms corresponding to about 120 Hz, and the number of the bias periods BP1, BP2, BP3 and BP4 included in each frame period FP may be changed from two as illustrated in FIG. 2 to four as illustrated in FIG. 9. Thus, even if the driving frequency of the display panel is changed from about 240 Hz to about 120 Hz, the bias operation for the pixel 100 may be performed at the substantially constant frequency, for example about 480 Hz. In other examples, a frame period FP corresponding to a driving frequency of about 160 Hz may include three bias periods, a frame period FP corresponding to a driving frequency of about 96 Hz may include five bias periods, a frame period FP corresponding to a driving frequency of about 80 Hz may include six bias periods, a frame period FP corresponding to a driving frequency of about 68 Hz may include seven bias periods, and a frame period FP corresponding to a driving frequency of about 60 Hz may include eight bias periods. Accordingly, even if the display panel is driven at the variable driving frequency, the bias operation for each pixel 100 may be performed at the substantially constant frequency (e.g., about 480 Hz), and the bias may be applied to the first transistor T1 of each pixel 100 at the substantially constant frequency. Accordingly, since the bias is periodically applied to the first transistor T1 at the substantially constant frequency, and the hysteresis of the first transistor T1 is periodically compensated at the substantially constant frequency, the pixel 100 and the display panel may have a substantially uniform luminance.

Figure 10:
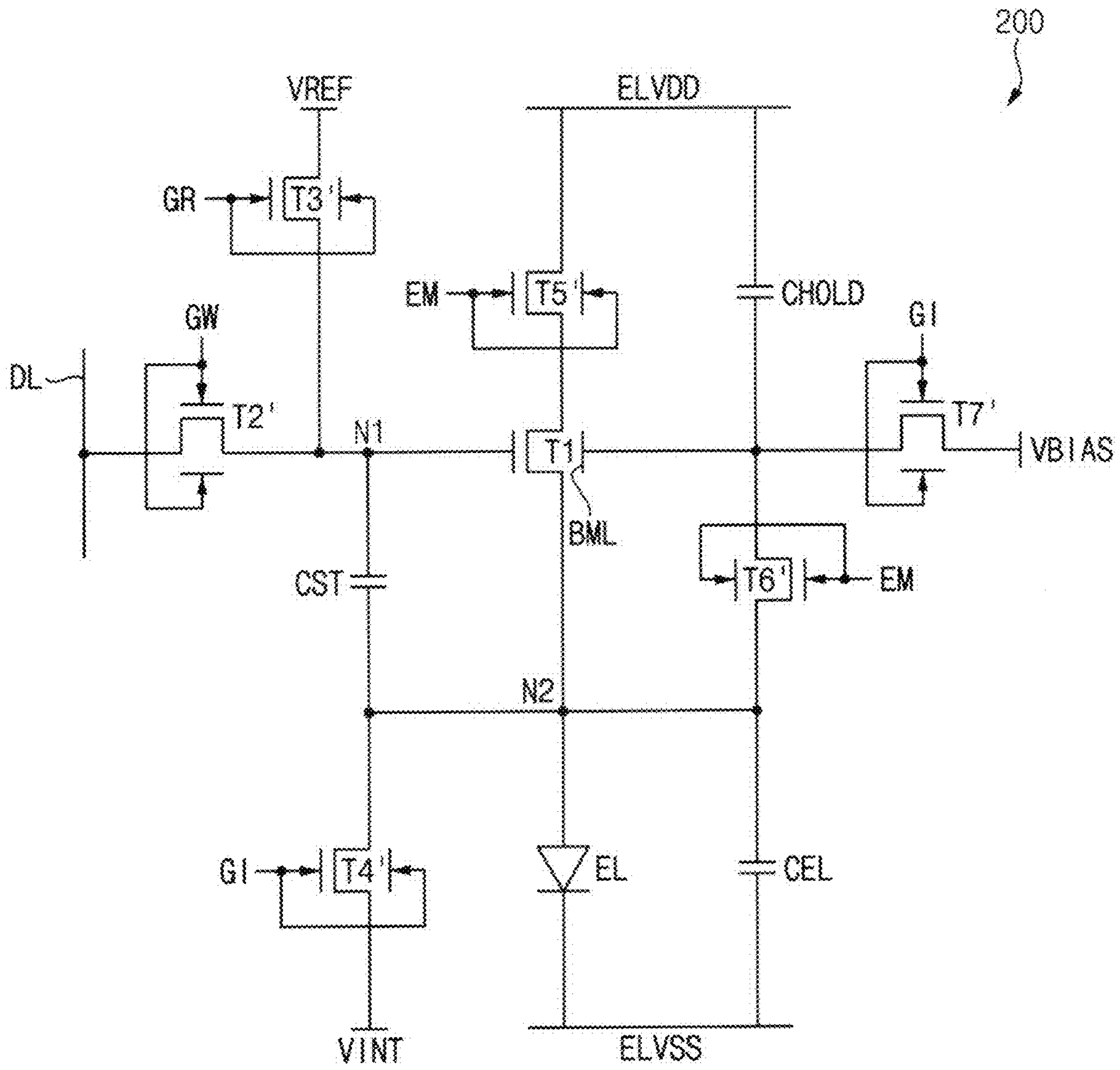
FIG. 10 is a circuit diagram illustrating a pixel of a display device according to embodiments.

FIG. 10 is a circuit diagram illustrating a pixel of a display device according to embodiments.

Referring to FIG. 10, a pixel 200 according to embodiments may include a first transistor T1, a second transistor T2', a third transistor T3', a fourth transistor T4', a fifth transistor T5', a sixth transistor T6', a seventh transistor T7', a storage capacitor CST, a holding capacitor CHOLD, a light emitting element EL and a diode capacitor CEL. The pixel 200 of FIG. 10 may have substantially the same structure and substantially the same operation as a pixel 100 of FIG. 1, except that not only the first transistor T1, but also the second through seventh transistors T2' through T7' have dual gate structures.

Each of the second through seventh transistors T2' through T7' may have a dual gate structure having a top gate and a bottom gate. Further, the top gate and the bottom gate of each of the second through seventh transistors T2' through T7' may receive substantially the same signal. For example, the top gate and the bottom gate of the second transistor T2' may receive substantially the same writing signal GW, the top gate and the bottom gate of the third transistor T3' may receive substantially the same reset signal GR, the top gate and the bottom gate of the fourth transistor T4' or the seventh transistor T7' may receive substantially the same initialization signal GI, and the top gate and the bottom gate of the fifth transistor T5' or the sixth transistor T6' may receive substantially the same emission signal EM. In this case where each of the second through seventh transistors T2' through T7' has the dual gate structure, and the top gate and the bottom gate of each of the second through seventh transistors T2' through T7' receives substantially the same signal, a mobility of each of the second through seventh transistors T2' through T7' may be improved.

Figure 11:
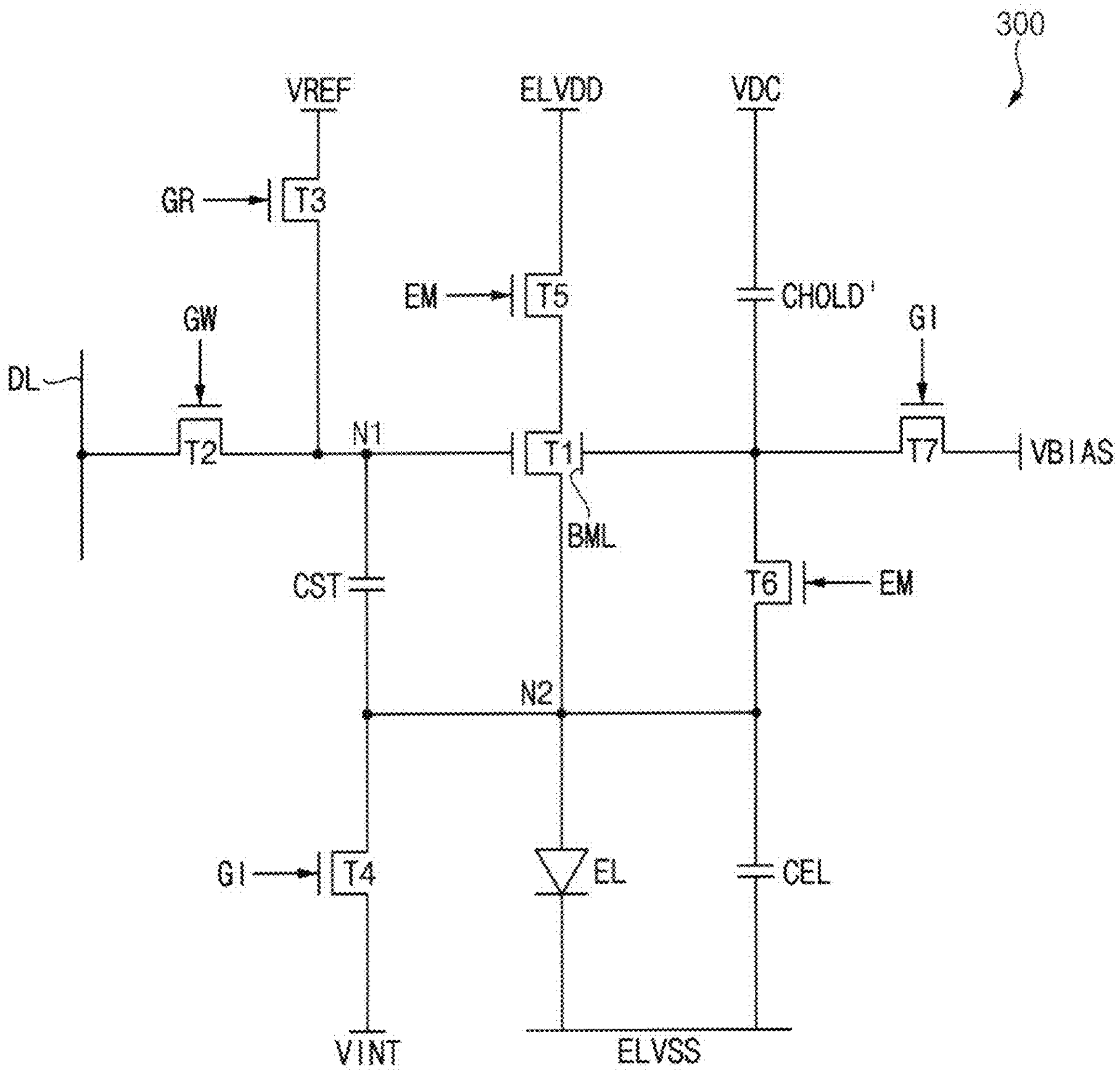
FIG. 11 is a circuit diagram illustrating a pixel of a display device according to embodiments.

FIG. 11 is a circuit diagram illustrating a pixel of a display device according to embodiments.

Referring to FIG. 11, a pixel 300 according to embodiments may include first through seventh transistors T1 through T7, a storage capacitor CST, a holding capacitor CHOLD', a light emitting element EL and a diode capacitor CEL. The pixel 300 of FIG. 11 may have substantially the same structure and substantially the same operation as a pixel 100 of FIG. 1, except that the holding capacitor CHOLD' is coupled between a line of a direct current (DC) voltage VDC and a bottom gate BML of the first transistor T1. Although FIG. 11 illustrates an example where only the first transistor T1 has a dual gate structure, in other embodiments, not only the first transistor T1 but also the second through seventh transistors T2 through T7 may have dual gate structures.

The holding capacitor CHOLD' may include a first electrode coupled to the line of the DC voltage VDC and a second electrode coupled to the bottom gate BML of the first transistor T1 and a first terminal of the sixth transistor T6. The DC voltage VDC may be different from a first power supply voltage ELVDD and a second power supply voltage ELVSS, and may be any voltage having a substantially constant (or fixed) voltage level. In some embodiments, the DC voltage VDC may be a reference voltage VREF or an initialization voltage VINT, and the line of the DC voltage VDC may be a line of the reference voltage VREF or a line of the initialization voltage VINT. In other embodiments, the DC voltage VDC may be different from all of the first power supply voltage ELVDD, the second power supply voltage ELVSS, the reference voltage VREF and the initialization voltage VINT.

Figure 12:
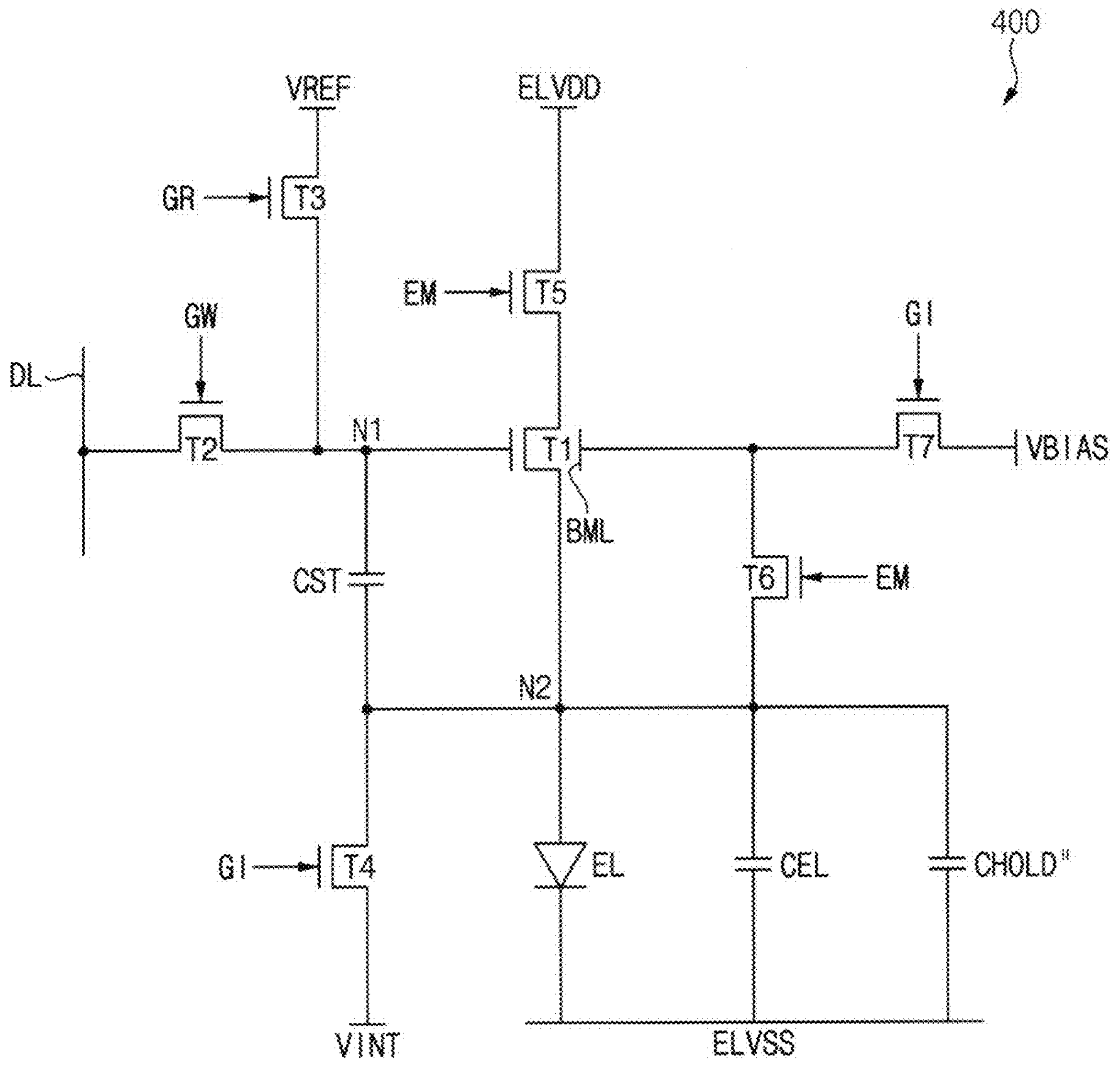
FIG. 12 is a circuit diagram illustrating a pixel of a display device according to embodiments.

FIG. 12 is a circuit diagram illustrating a pixel of a display device according to embodiments.

Referring to FIG. 12, a pixel 400 according to embodiments may include first through seventh transistors T1 through T7, a storage capacitor CST, a holding capacitor CHOLD", a light emitting element EL and a diode capacitor CEL. The pixel 400 of FIG. 12 may have substantially the same structure and substantially the same operation as a pixel 100 of FIG. 1, except that the holding capacitor CHOLD" is coupled between a second node N2 and a line of a second power supply voltage ELVSS. The holding capacitor CHOLD" may include a first electrode coupled to the second node N2, and a second electrode coupled to the line of the second power supply voltage ELVSS. Although FIG. 12 illustrates an example where only the first transistor T1 has a dual gate structure, in other embodiments, not only the first transistor T1 but also the second through seventh transistors T2 through T7 may have dual gate structures.

Figure 13:
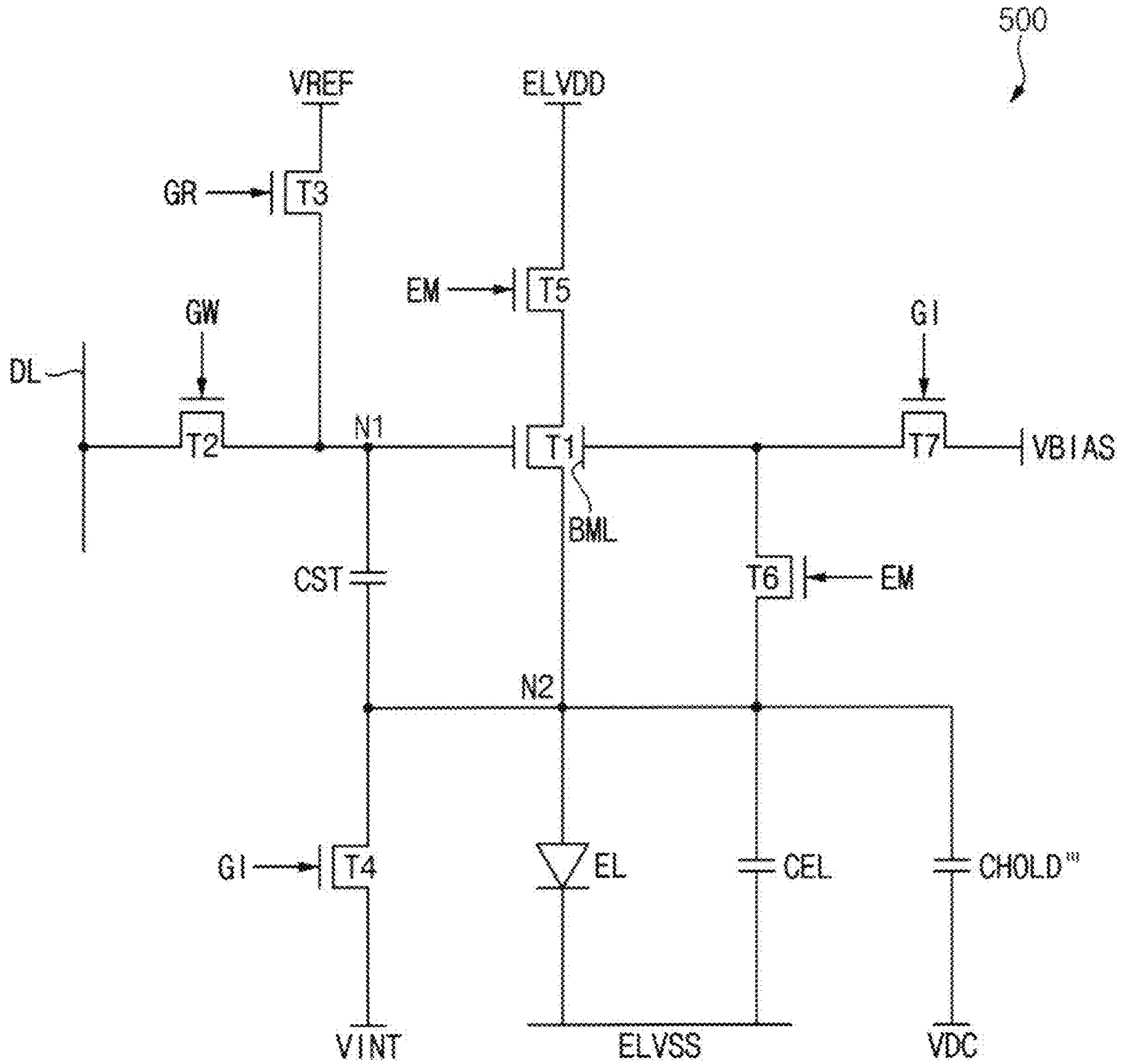
FIG. 13 is a circuit diagram illustrating a pixel of a display device according to embodiments.

FIG. 13 is a circuit diagram illustrating a pixel of a display device according to embodiments.

Referring to FIG. 13, a pixel 500 according to embodiments may include first through seventh transistors T1 through T7, a storage capacitor CST, a holding capacitor CHOLD'", a light emitting element EL and a diode capacitor CEL. The pixel 500 of FIG. 13 may have substantially the same structure and substantially the same operation as a pixel 100 of FIG. 1, except that the holding capacitor CHOLD'" is coupled between a second node N2 and a line of a DC voltage VDC. The holding capacitor CHOLD" may include a first electrode coupled to the second node N2, and a second electrode coupled to the line of the DC voltage VDC. The DC voltage VDC may be different from a first power supply voltage ELVDD and a second power supply voltage ELVSS, and may be any voltage having a substantially constant (or fixed) voltage level. Although FIG. 13 illustrates an example where only the first transistor T1 has a dual gate structure, in other embodiments, not only the first transistor T1 but also the second through seventh transistors T2 through T7 may have dual gate structures.

Figure 14:
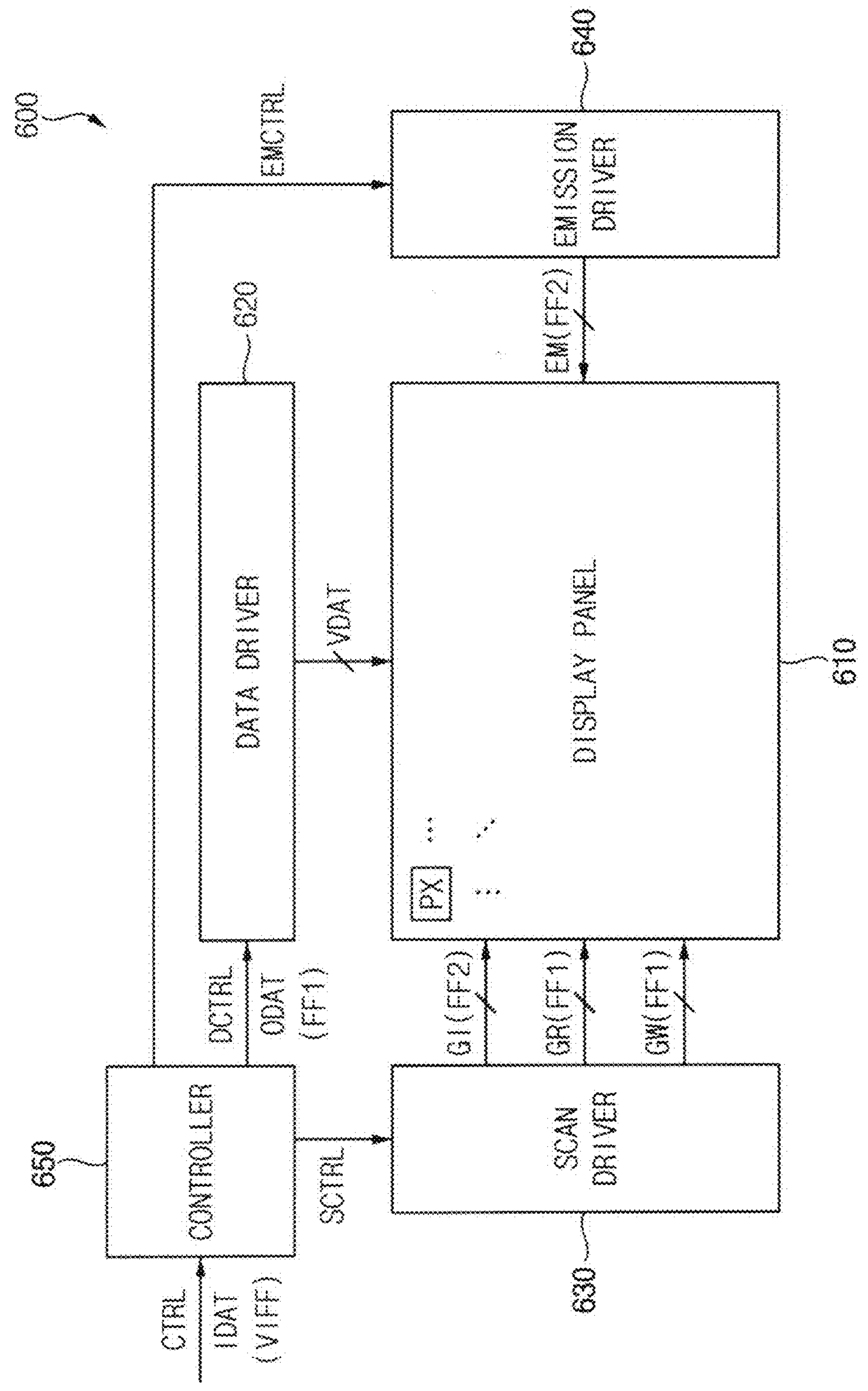
FIG. 14 is a block diagram illustrating a display device according to embodiments.
Figure 15:
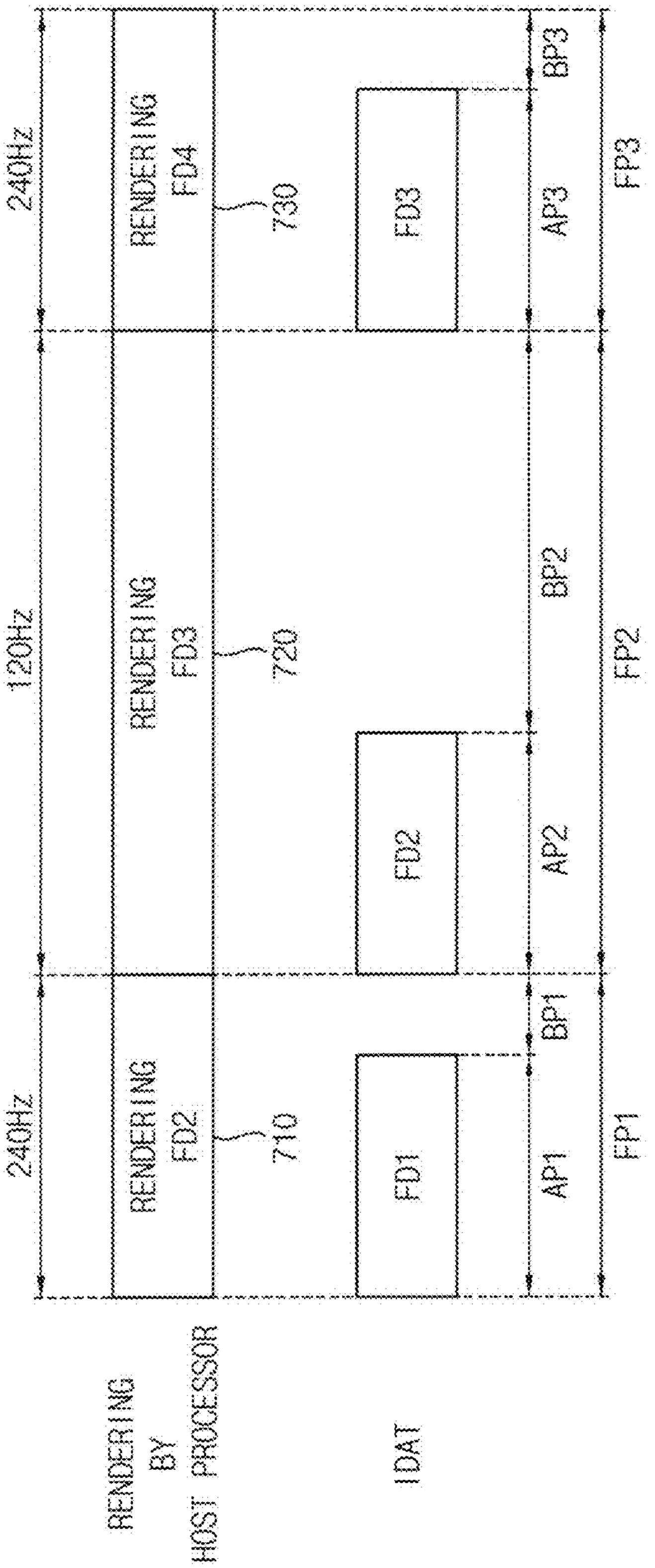
FIG. 15 is a timing diagram for describing an example of input image data provided to a display device according to embodiments.
Figure 16:
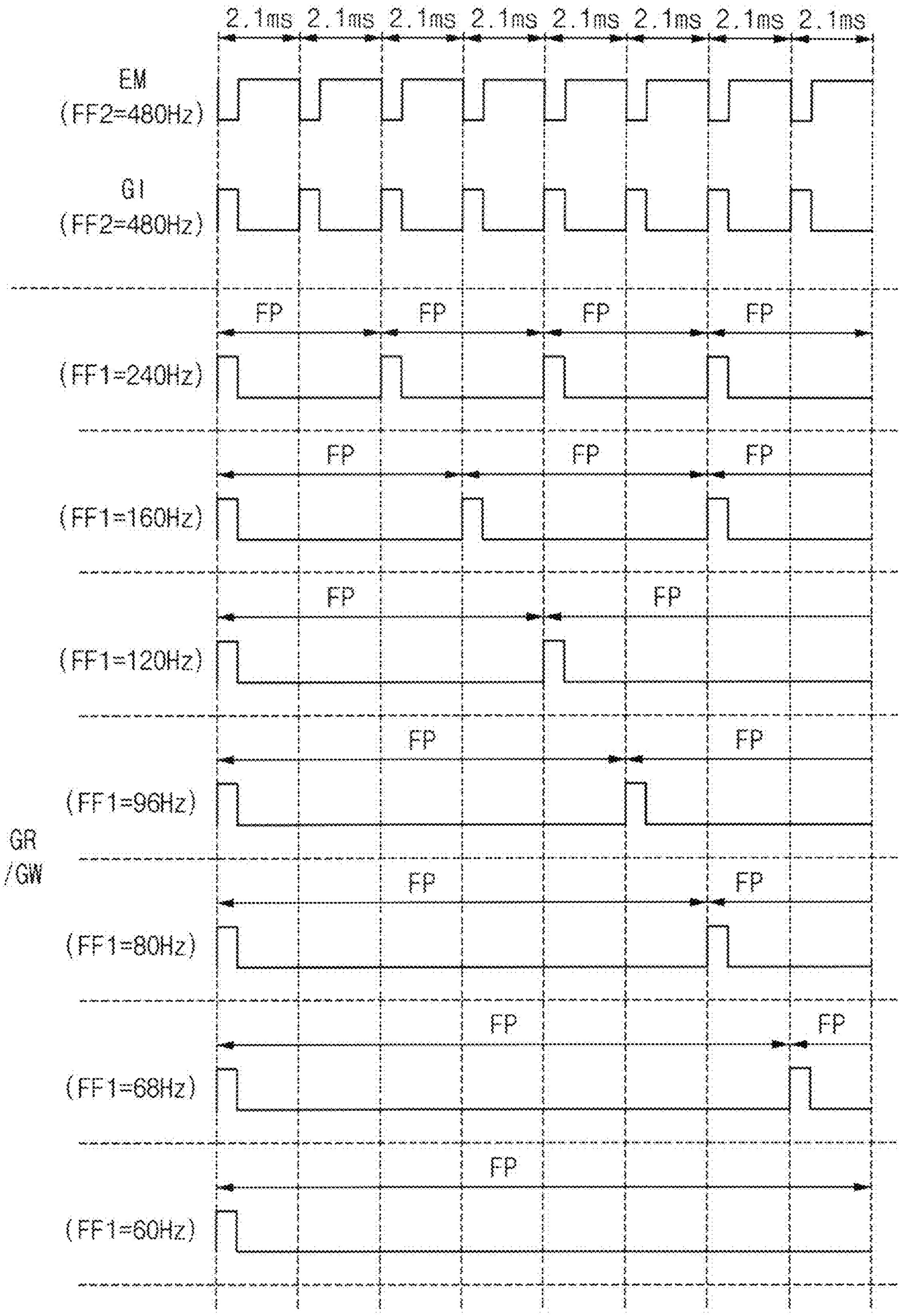
FIG. 16 is a diagram for describing examples of emission signals, initialization signals, reset signals and writing signals according to driving frequencies of a display panel.

FIG. 14 is a block diagram illustrating a display device according to embodiments, FIG. 15 is a timing diagram for describing an example of input image data provided to a display device according to embodiments, and FIG. 16 is a diagram for describing examples of emission signals, initialization signals, reset signals and writing signals according to driving frequencies of a display panel.

Referring to FIG. 14, a display device 600 according to embodiments may include a display panel 610, a data driver 620, a scan driver 630, an emission driver 640 and a controller 650.

The display panel 610 may include a plurality of pixels PX. According to embodiments, each pixel PX of the display panel 610 may be a pixel 100 of FIG. 1, a pixel 200 of FIG. 10, a pixel 300 of FIG. 11, a pixel 400 of FIG. 12, a pixel 500 of FIG. 13, or a pixel having a similar structure. Even if a driving frequency (or a first frequency FF1) of the display panel 610 is changed, each pixel PX may perform a bias operation that applies a bias voltage to a bottom gate of a first transistor of the pixel PX at a constant (or fixed) frequency (or a second frequency FF2).

The data driver 620 may provide data voltages VDAT to the plurality of pixels PX based on output image data ODAT and a data control signal DCTRL received from the controller 650. In some embodiments, the data control signal DCTRL may include, but not limited to, an output data enable signal, a horizontal start signal and a load signal. The data driver 620 may receive, as output image data ODAT, frame data at the first frequency FF1 (or the driving frequency of the display panel 610). In some embodiments, the data driver 620 and the controller 650 may be implemented as a single integrated circuit, and the single integrated circuit may be referred to as a timing controller embedded data driver (TED) integrated circuit. In other embodiments, the data driver 620 and the controller 650 may be implemented as separate integrated circuits.

The scan driver 630 may provide writing signals GW, reset signals GR and initialization signals GI to the plurality of pixels PX based on a scan control signal SCTRL received from the controller 650. In some embodiments, the scan control signal SCTRL may include, but not limited to, a scan start signal and a scan clock signal. In some embodiments, the scan driver 630 may provide the writing signal GW and the reset signal GR to each of the plurality of pixels PX at the first frequency FF1, and may provide the initialization signal GI to each of the plurality of pixels PX at the second frequency FF2 different from the first frequency FF1. Further, in some embodiments, the first frequency FF1 may be the driving frequency of the display panel 610 and may be a variable frequency. Further, the second frequency FF2 may be a fixed (or constant) frequency that is not changed even if the driving frequency of the display panel 610 is changed. In some embodiments, the scan driver 630 may be integrated or formed in a peripheral portion of the display panel 610. In other embodiments, the scan driver 630 may be implemented as one or more integrated circuits.

The emission driver 640 may provide emission signals EM to the plurality of pixels PX based on an emission control signal EMCTRL received from the controller 650. The emission control signal EMCTRL may include, but not limited to, an emission start signal and an emission clock signal. In some embodiments, the emission driver 640 may provide the emission signal EM to each of the plurality of pixels at the second frequency FF2. In some embodiments, the emission driver 640 may be integrated or formed in the peripheral portion of the display panel 610. In other embodiments, the emission driver 640 may be implemented as one or more integrated circuits.

The controller 650 (e.g., a timing controller) may receive input image data IDAT and a control signal CTRL from an external host processor (e.g., a graphics processing unit (GPU), an application processor (AP) or a graphics card). In some embodiments, the input image data IDAT may be RGB image data including red image data, green image data and blue image data. In some embodiments, the control signal CTRL may include, but not limited to, a vertical synchronization signal, a horizontal synchronization signal, an input data enable signal, a master clock signal, etc. The controller 650 may generate the output image data ODAT, the data control signal DCTRL, the scan control signal SCTRL and the emission control signal EMCTRL based on the input image data IDAT and the control signal CTRL. The controller 650 may control an operation of the data driver 620 by providing the output image data ODAT and the data control signal DCTRL to the data driver 620, may control an operation of the scan driver 630 by providing the scan control signal SCTRL to the scan driver 630, and may control an operation of the emission driver 640 by providing the emission control signal EMCTRL to the emission driver 640.

In some embodiments, the controller 650 of the display device 300 according to embodiments may receive the input image data IDAT at a variable input frame frequency VIFF from the host processor in a variable frame mode (e.g., a Free-Sync mode, a G-Sync mode, a Q-Sync mode, etc.). For example, as illustrated in FIG. 15, a period of each of renderings 710, 720 and 730 by the host processor may not be constant (in particular, in a case where game image data are rendered), and the host processor may provide the input image data IDAT, or frame data FD1, FD2 and FD3 to the display device 600 in synchronization with, respectively, these irregular periods of renderings 710, 720 and 730 in the variable frame mode. For example, in the variable frame mode, each frame period FP1, FP2 and FP3 may include a constant active period AP1, AP2 and AP3 having a constant time length, and the host processor may provide the frame data FD1, FD2 and FD3 to the display device 600 at the variable input frame frequency VIFF by changing a time length of a variable blank period BP1, BP2 and BP3 of the frame period FP1, FP2 and FP3. For example, the variable input frame frequency VIFF may be changed within a range from about 1 Hz to about 240 Hz in each frame period FP1, FP2 and FP3.

Further, in the variable frame mode, the driving frequency of the display panel 610, or the first frequency FF1 may be determined as one of divisors of a frequency of the bias operation or the second frequency FF2. For example, as illustrated in FIG. 16, in a case where the frequency of the bias operation, or the second frequency FF2 is about 480 Hz, the driving frequency of the display panel 610 or the first frequency FF1 may be determined as one of divisors of about 480 Hz, for example, about 240 Hz, about 160 Hz, about 120 Hz, about 96 Hz, about 80 Hz, about 68 Hz, about 60 Hz, or the like. Thus, the driving frequency of the display panel 610 or the first frequency FF1 may be selected from about 240 Hz, about 160 Hz, about 120 Hz, about 96 Hz, about 80 Hz, about 68 Hz, about 60 Hz, or the like according to the variable input frame frequency VIFF, and the scan driver 630 may provide the reset signal GR and the writing signal GW at the first frequency FF1 determined as one of about 240 Hz, about 160 Hz, about 120 Hz, about 96 Hz, about 80 Hz, about 68 Hz, about 60 Hz, or the like. That is, the scan driver 630 may provide the reset signal GR and the writing signal GW only once to each pixel PX in each frame period FP corresponding to the first frequency FF1. However, even if the driving frequency of the display panel 610, or the first frequency FF1 is changed to one of about 240 Hz, about 160 Hz, about 120 Hz, about 96 Hz, about 80 Hz, about 68 Hz, about 60 Hz, or the like, the scan driver 630 may provide the initialization signal GI to each pixel PX at the second frequency FF2 that is the fixed frequency, and the emission driver 640 may provide the emission signal EM to each pixel PX at the second frequency FF2 that is the fixed frequency. Accordingly, even if the driving frequency of the display panel 610 or the first frequency FF1 is changed, each pixel PX may receive the emission signal EM and the initialization signal GI at the second frequency FF2 that is the fixed frequency, and may perform the bias operation at the second frequency FF2 that is the fixed frequency. A hysteresis of the first transistor of each pixel PX may be periodically compensated at the second frequency FF2 that is the fixed frequency, and thus a luminance of the display panel 610 may be substantially uniform at the first frequency FF1 or a variable driving frequency. Although FIG. 16 illustrates an example where the frequency of the bias operation or the second frequency FF2 is about 480 Hz, the frequency of the bias operation in the display device 600 according to embodiments is not limited to the example of FIG. 16. Further, although the emission signal EM, the initialization signal GI, the reset signal GR and the writing signal GW are simplified in FIG. 16, the emission signal EM, the initialization signal GI, the reset signal GR and the writing signal GW may have timings illustrated in FIG. 2 or FIG. 9.

In some embodiments, the scan driver 630 and the emission driver 640 may initiate operations that sequentially provide the initialization signals GI and the emission signals EM to the plurality of pixels PX on a row-by-row basis at the second frequency FF2 that is the fixed frequency even if the vertical synchronization signal is not receive from the host processor. For example, in a case where the first frequency FF1 is about 240 Hz, the display device 600 may receive the vertical synchronization signal once in each frame period FP, and may provide the emission signal EM, the writing signal GW, the reset signal GR and the initialization signal GI in response to the vertical synchronization signal. Thereafter, for example, after about 2.1 ms, the display device 600 may additionally provide the emission signal EM and the initialization signal GI to each pixel PX regardless of the vertical synchronization signal. As described above, the scan driver 630 and the emission driver 640 may additionally provide the emission signal EM and the initialization signal GI regardless of the vertical synchronization signal, and this operation that provides the initialization signal GI by the scan driver 630 (and/or an operation that provides the emission signal EM by the emission driver 640) may be referred to as a self scan operation.

Figure 17:
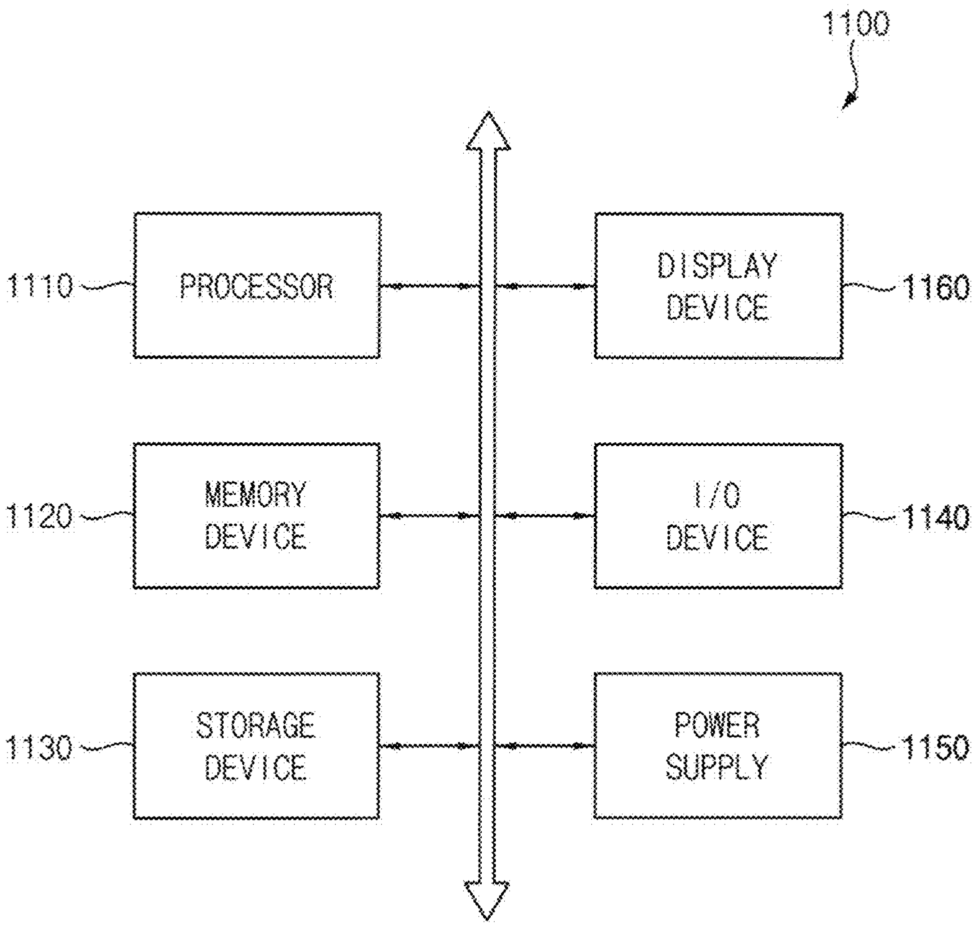
FIG. 17 is a block diagram illustrating an electronic device including a display device according to embodiments.

FIG. 17 is a block diagram illustrating an electronic device including a display device according to embodiments.

Referring to FIG. 17, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, a sixth transistor of each pixel may separate a bottom gate of a first transistor from a second node, and a seventh transistor of the pixel may apply a bias voltage to the bottom gate of the first transistor. Accordingly, in each pixel of the display device 1160, a hysteresis of the first transistor may be compensated without affecting the second node. Further, the hysteresis of the first transistor may be periodically compensated, and thus a luminance of a display panel of the display device 1160 may be uniform at a variable driving frequency or at different driving frequencies.

The inventive concepts may be applied to any display device 1160, and any electronic device 1100 including the display device 1160. For example, the inventive concepts may be applied to a smart phone, a wearable electronic device, a tablet computer, a mobile phone, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A pixel of a display device, the pixel comprising:

a first transistor including a first gate coupled to a first node, a first terminal, a second terminal coupled to a second node, and a second gate;

a second transistor including a gate coupled to a writing signal line, a first terminal coupled to a data line, and a second terminal coupled to the first node;

a storage capacitor coupled between the first node and the second node;

a light emitting element coupled between the first transistor and a second power supply voltage line; and a sixth transistor coupled to the second gate of the first transistor and directly coupled to the light emitting element.

2. The pixel of claim 1, further comprising:

a third transistor configured to apply a reference voltage to the first node.

3. The pixel of claim 2, wherein the third transistor includes a gate coupled to a reset signal line, a first terminal coupled to a line of the reference voltage, and a second terminal coupled to the first node.

4. The pixel of claim 1, further comprising:

a fourth transistor configured to apply an initialization voltage to the light emitting element.

5. The pixel of claim 4, wherein the fourth transistor includes a gate coupled to an initialization signal line, a first terminal coupled to a line of the initialization voltage, and a second terminal coupled to the light emitting element.

6. The pixel of claim 1, wherein the sixth transistor includes a gate coupled to an emission signal line, a first terminal coupled to the second gate of the first transistor, and a second terminal coupled to the second node.

7. The pixel of claim 1, further comprising:

a seventh transistor including a first terminal coupled to a bias voltage line and a second terminal coupled to the second gate of the first transistor.

8. The pixel of claim 7, wherein the seventh transistor further includes a gate coupled to an initialization signal line.

9. The pixel of claim 1, further comprising:

a fifth transistor including a gate coupled to an emission signal line, a first terminal coupled to a first power supply voltage line, and a second terminal coupled to the first terminal of the first transistor.

10. The pixel of claim 1, further comprising:

a holding capacitor configured to hold a voltage of the second node.

11. The pixel of claim 10, wherein the holding capacitor includes a first electrode coupled to a first power supply voltage line and a second electrode coupled to the second gate of the first transistor.

12. The pixel of claim 1, wherein each frame period of a plurality of frame periods for the pixel includes:

an initialization period in which the first node and the second node are initialized;

a compensation period in which a threshold voltage of the first transistor is compensated;

a data writing period in which a data voltage of the data line is written;

at least one bias period in which the second node is initialized and a bias voltage is applied to the second gate of the first transistor; and at least one emission period in which the light emitting element emits light.

13. The pixel of claim 12, wherein, in the initialization period, an emission signal line and the writing signal line have a turn-off level, a reset signal line has a turn-on level to apply a reference voltage to the first node, and an initialization signal line has the turn-on level to apply an initialization voltage to the second node.

14. The pixel of claim 12, wherein, in the compensation period, an initialization signal line and the writing signal line have a turn-off level, a reset signal line has a turn-on level to apply a reference voltage to the first node, an emission signal line has the turn-on level, and a voltage of the second node is saturated to a voltage corresponding to the threshold voltage subtracted from the reference voltage.

15. The pixel of claim 12, wherein, in the data writing period, an emission signal line, an initialization signal line and a reset signal line have a turn-off level and the writing signal line has a turn-on level to apply the data voltage to the first node.

16. The pixel of claim 12, wherein, in the bias period, an emission signal line, a reset signal line and the writing signal line have a turn-off level, an initialization signal line has a turn-on level, a fourth transistor is turned on in response to an initialization signal of the initialization signal line having the turn-on level to apply an initialization voltage to the second node, the sixth transistor separates the second gate of the first transistor from the second node in response to an emission signal of the emission signal line having the turn-off level, and a seventh transistor is turned on in response to the initialization signal to apply a bias voltage to the second gate of the first transistor.

17. The pixel of claim 12, wherein, in the emission period, an initialization signal line, a reset signal line and the writing signal line have a turn-off level, an emission signal line has a turn-on level, the first transistor is turned on based on the data voltage, a fifth transistor is turned on in response to an emission signal of the emission signal line having the turn-on level, and the light emitting element emits the light.

18. An electronic device, comprising:

a display device including a plurality of pixels; and a host providing input image data to the display device, wherein each of the plurality of pixels includes:

a first transistor including a first gate coupled to a first node, a first terminal, a second terminal coupled to a second node, and a second gate;

a second transistor including a gate receiving a writing signal, a first terminal coupled to a data line, and a second terminal coupled to the first node;

a storage capacitor including a first electrode coupled to the first node and a second electrode coupled to the second node;

a third transistor including a gate receiving a reset signal, a first terminal coupled to a reference voltage line, and a second terminal coupled to the first node;

a fifth transistor including a gate receiving an emission signal, a first terminal coupled to a first power supply voltage line, and a second terminal coupled to the first terminal of the first transistor;

a holding capacitor including a first electrode coupled to the first power supply voltage line and a second electrode coupled to the second gate of the first transistor;

a light emitting element coupled between the first transistor and a second power supply voltage line; and a sixth transistor coupled to the second gate of the first transistor and directly coupled to the light emitting element.

19. The electronic device of claim 18, further comprising:

a fourth transistor including a gate receiving an initialization signal, a first terminal coupled to an initialization voltage line, and a second terminal coupled to the light emitting element.

20. The electronic device of claim 18, further comprising:

a seventh transistor including a first terminal coupled to a bias voltage line and a second terminal coupled to the second gate of the first transistor.

* * * * *